US010798677B2

(12) United States Patent
Zee et al.

(10) Patent No.: US 10,798,677 B2
(45) Date of Patent: Oct. 6, 2020

(54) METHODS AND APPARATUS FOR PAGING AN INACTIVE UE IN A WIRELESS NETWORK

(71) Applicant: Telefonaktiebolaget LM Ericsson (publ), Stockholm (SE)

(72) Inventors: Oscar Zee, Stockholm (SE); Angelo Centonza, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/087,719

(22) PCT Filed: Apr. 13, 2017

(86) PCT No.: PCT/SE2017/050377
§ 371 (c)(1),
(2) Date: Sep. 24, 2018

(87) PCT Pub. No.: WO2017/180055
PCT Pub. Date: Oct. 19, 2017

(65) Prior Publication Data
US 2019/0082418 A1 Mar. 14, 2019

Related U.S. Application Data

(60) Provisional application No. 62/323,082, filed on Apr. 15, 2016.

(51) Int. Cl.
*H04W 68/02* (2009.01)
*H04W 68/04* (2009.01)
(Continued)

(52) U.S. Cl.
CPC ........... *H04W 68/02* (2013.01); *H04W 36/08* (2013.01); *H04W 68/025* (2013.01);
(Continued)

(58) Field of Classification Search
CPC ...... H04W 68/02; H04W 68/04; H04W 92/20
See application file for complete search history.

(56) References Cited

U.S. PATENT DOCUMENTS 8,380,229 B1 * 2/2013 Spencer ............. H04W 68/025
455/458
8,938,266 B1 1/2015 Goyal et al.
(Continued)

FOREIGN PATENT DOCUMENTS

EP 2890192 A1 7/2015

OTHER PUBLICATIONS

R3-060151 meeting#51; "transferring a paging request message" (Year: 2006).*
(Continued)

*Primary Examiner* — Parth Patel
(74) *Attorney, Agent, or Firm* — Murphy, Bilak & Homiller, PLLC

(57) ABSTRACT

In case of an UE in an inactive state (RRC disconnected but Core Network connected), the Core Network cannot page the UE because this one is formally connected. The UE is therefore paged at RAN-level. In detail, the first Base Station that receives downlink data or control signalling for the UE, pages the UE. If the UE does not reply, the first Base Station requests second Base Stations to page the UE. If not found the request is enlarged from the second BS to further Base stations and so on until either the UE is found or a maximum number of hops is reached. The Base Stations trace then backwards the information that the UE has been paged until the first BS.

6 Claims, 14 Drawing Sheets

(51) Int. Cl.
  *H04W 92/20* (2009.01)
  *H04W 76/19* (2018.01)
  *H04W 76/28* (2018.01)
  *H04W 76/27* (2018.01)
  *H04W 36/08* (2009.01)

(52) U.S. Cl.
  CPC .......... *H04W 68/04* (2013.01); *H04W 76/19* (2018.02); *H04W 76/27* (2018.02); *H04W 76/28* (2018.02); *H04W 92/20* (2013.01)

(56) References Cited

U.S. PATENT DOCUMENTS

| | | | | |
|---|---|---|---|---|
| 8,996,042 | B1* | 3/2015 | Hannigan | H04W 68/04 |
| | | | | 455/458 |
| 9,544,874 | B2* | 1/2017 | Nishida | H04W 68/005 |
| 9,955,453 | B2* | 4/2018 | Rashid | H04W 68/02 |
| 9,980,105 | B2* | 5/2018 | Saxena | H04L 41/0813 |
| 10,045,394 | B2* | 8/2018 | Vajapeyam | H04W 72/0446 |
| 10,117,221 | B2* | 10/2018 | Yu | H04W 68/02 |
| 10,149,277 | B2* | 12/2018 | Qu | H04W 68/08 |
| 10,172,112 | B2* | 1/2019 | Diachina | H04W 68/005 |
| 10,172,183 | B2* | 1/2019 | Diachina | H04W 68/005 |
| 10,470,158 | B2* | 11/2019 | Yamada | H04W 28/0289 |
| 2008/0146253 | A1* | 6/2008 | Wentink | H04W 68/02 |
| | | | | 455/458 |
| 2010/0312846 | A1* | 12/2010 | Lu | H04W 68/00 |
| | | | | 709/206 |
| 2011/0310868 | A1* | 12/2011 | Yang | H04W 68/00 |
| | | | | 370/338 |
| 2012/0004004 | A1* | 1/2012 | Song | H04W 48/20 |
| | | | | 455/515 |
| 2012/0147824 | A1* | 6/2012 | Van der Merwe | H04W 84/02 |
| | | | | 370/329 |
| 2012/0208570 | A1* | 8/2012 | Park | H04W 76/38 |
| | | | | 455/466 |
| 2012/0218941 | A1* | 8/2012 | Nakatsugawa | H04W 52/0206 |
| | | | | 370/328 |
| 2012/0252481 | A1* | 10/2012 | Anpat | H04W 8/06 |
| | | | | 455/456.1 |
| 2013/0015953 | A1* | 1/2013 | Hsu | H04W 4/08 |
| | | | | 340/7.46 |
| 2013/0017797 | A1* | 1/2013 | Ramasamy | H04B 17/382 |
| | | | | 455/226.1 |
| 2013/0267261 | A1* | 10/2013 | Nikkelen | H04W 68/00 |
| | | | | 455/458 |
| 2014/0051466 | A1* | 2/2014 | Yu | H04W 4/14 |
| | | | | 455/466 |
| 2014/0092801 | A1* | 4/2014 | Kim | H04L 12/1877 |
| | | | | 370/312 |
| 2014/0307550 | A1* | 10/2014 | Forssell | H04W 36/22 |
| | | | | 370/235 |
| 2015/0017980 | A1* | 1/2015 | Chu | H04W 24/04 |
| | | | | 455/433 |
| 2015/0119088 | A1* | 4/2015 | Lee | H04W 68/02 |
| | | | | 455/458 |
| 2015/0141062 | A1* | 5/2015 | Ostrup | H04W 68/04 |
| | | | | 455/458 |
| 2015/0215978 | A1* | 7/2015 | Casati | H04W 76/12 |
| | | | | 370/329 |
| 2015/0245192 | A1* | 8/2015 | Wu | H04W 8/005 |
| | | | | 370/329 |
| 2015/0282118 | A1* | 10/2015 | Vaidya | H04W 8/06 |
| | | | | 455/458 |
| 2016/0057730 | A1* | 2/2016 | Truelove | H04W 76/10 |
| | | | | 455/434 |
| 2016/0198514 | A1* | 7/2016 | Wang | H04W 52/0209 |
| | | | | 370/311 |
| 2016/0286524 | A1* | 9/2016 | Griot | H04L 41/00 |
| 2016/0295598 | A1* | 10/2016 | Chen | H04W 52/14 |
| 2016/0309448 | A1* | 10/2016 | Truelove | H04W 8/22 |
| 2016/0337934 | A1* | 11/2016 | Meng | H04L 45/00 |
| 2016/0374048 | A1* | 12/2016 | Griot | H04W 4/70 |
| 2017/0238278 | A1* | 8/2017 | Yadav | H04W 28/0289 |
| | | | | 370/329 |
| 2017/0311247 | A1* | 10/2017 | Qi | H04W 68/04 |
| 2017/0332348 | A1* | 11/2017 | Takahashi | H04W 28/14 |
| 2017/0367044 | A1* | 12/2017 | Fujishiro | H04W 4/14 |
| 2018/0035403 | A1* | 2/2018 | Yu | H04W 68/02 |
| 2018/0070237 | A1* | 3/2018 | Cho | H04L 63/126 |
| 2018/0184398 | A1* | 6/2018 | Al | H04W 68/02 |
| 2018/0249479 | A1* | 8/2018 | Cho | H04L 63/0428 |
| 2018/0263012 | A1* | 9/2018 | Ryu | H04W 68/02 |
| 2018/0288680 | A1* | 10/2018 | Yamada | H04W 48/06 |
| 2019/0029000 | A1* | 1/2019 | Vikberg | H04W 68/02 |
| 2019/0037521 | A1* | 1/2019 | Shimojou | H04W 36/12 |
| 2019/0082418 | A1* | 3/2019 | Zee | H04W 68/025 |

OTHER PUBLICATIONS

Unknown, Author, "Consideration on dormant mode of LTE active state", 3GPP TSG RAN WG3 Meeting #52, R3-060699, Shanghai, China, May 8-12, 2006, 1-5.

Unknown, Author, "Handling of inactive UEs", 3GPP TSG-RAN WG3 #91bis R3-160845 Bangalore, India, Apr. 11-15, 2016, 1-4.

Unknown, Author, "Hierarchical Tracking Area", 3GPP TSG RAN WG3 Meeting #51, R3-060153, Denver, Colorado, Feb. 13-17, 2006, 1-5.

Unknown, Author, "Transferring a paging request message", 3GPP TSG RAN WG3 Meeting #51, R3-060151, Denver, Colorado, Feb. 13-17, 2006, 1-2.

* cited by examiner

METHODS AND APPARATUS FOR PAGING AN INACTIVE UE IN A WIRELESS NETWORK

TECHNICAL FIELD

Examples of the present disclosure relate to methods and apparatus in a wireless network, and particularly relate to methods and apparatus for paging terminal devices that may have been inactive for a period of time.

BACKGROUND

The third generation partnership project (3GPP) is currently working on standardization of Release 13 of the Long Term Evolution (LTE) concept. The architecture of the LTE system is shown in FIG. 1, and includes radio access nodes and core network nodes. The radio access nodes include eNodeBs (eNBs), Home eNodeBs (HeNBs), and HeNB gateways (HeNB GWs). The core network nodes include mobility management entities (MMEs) and serving gateways (S-GWs). As can be seen, an S1 interface connects HeNBs/eNBs to the MME/S-GW and connects HeNBs to the HeNB GW, while an X2 interface connects peer eNBs/HeNBs to each other, optionally via an X2 gateway (X2 GW). Those skilled in the art will appreciate that various nodes and node types are omitted for the purposes of clarity.

The system is provided with a management system. The node elements (i.e. the eNBs and/or the HeNBs) are managed by a domain manager (DM), also referred to as the operation and support system (OSS). A DM may further be managed by a network manager (NM). The interface between node elements is an X2 interface, whereas the interface between two DMs is referred to as Itf-P2P. The management system may configure the network elements, as well as receive observations associated with features in the network elements. For example, a DM may observe and configure node elements, while a NM may observe and configure DMs, as well as node elements via the DMs.

By means of configuration via the DM, NM and related interfaces, functions over the X2 and S1 interfaces can be carried out in a coordinated way throughout the radio access network (RAN), eventually involving the Core Network (CN), i.e. MME and S-GWs.

In current wireless communication networks (such as that shown in FIG. 1) the main contributors to signalling overhead and load are procedures used for UE state transition, e.g. during transition between idle and connected states. There is a significant signalling overhead on the Uu (radio) and S1 interfaces for small data transactions.

In order to reduce the signalling overhead and the associated processing load in the network 3GPP working groups have concluded that a solution will be introduced in Rel-13 that allows an RRC connection to be suspended and at a later time resumed, thus reducing the need to go through the full signalling procedure for a transition from the idle state to the connected state. The adopted solution is based on enhancements to the idle state that make it possible to resume the RRC connection without needing to set it up again when the UE returns from the idle state. The enhancements assume that most of the time the UE will return to a node which has the stored RRC context (e.g. the UE will remain in the same cell as when it transitioned to the idle state).

3GPP document R3-160845 notes that the solution agreed as part of 3GPP Release 13 is still subject to high signalling between the RAN and the CN. This is due to the fact that the solution still relies on sending the UE to Idle mode and paging the UE from the CN in order to trigger an Idle to Active transition that would allow the UE to enjoy bearer services.

The document goes on to explain that one solution to reduce such signalling load would be to maintain the UE in a new state called "inactive", where the UE would be in EPC Connected state, i.e. it will be connected at CN level, and where the UE would be in a state similar to Idle at RRC level. In this state the UE will not be paged by the CN because the CN would assume that the UE is in connected mode. However, in order to move to RRC Connected state, the UE would still need to receive signalling similar to a paging message. R3-160845 proposes that such paging for UEs in the RAN controlled "inactive state" is triggered by the RAN. However, no description on how this RAN paging should be performed is yet described in the 3GPP standard.

SUMMARY

One possible method to enable such paging consists of the eNB transmitting a trigger to paging command towards a core network node (such as the MME), and core network node then performs a regular paging. However, this method is not efficient as there is a risk that the core network node will page on a much wider area than necessary, given that the core network node does not know in which RAN neighbourhood the UE is located.

The invention is also applicable to the situation in which the UE is in an "idle" state, in which the connection between the core network and the base station for the UE is also idle. In such a state, the core network may initiate paging of the UE by sending a trigger message (such as a paging request message) to the base station for the UE.

In one aspect, the present disclosure provides a method in a network node of a wireless telecommunication network. The method comprises: initiating transmission, by a first base station, of a paging message for a terminal device; and initiating transmission by the first base station of a paging request message to a second base station. The paging request message comprises an indication of an identity of the terminal device, and a request that the second base station transmit a paging message for the terminal device.

The second base station may be a neighbour base station to the first base station.

The paging request message may be transmitted over an X2 interface.

The method may further comprise initiating transmission of the paging request message to all neighbour base stations.

In another aspect, the present disclosure provides a method in a network node of a wireless telecommunication network. The method comprises: responsive to receipt, by a second base station, of a paging request message from a first base station, wherein the paging request message comprises an indication of an identity of a terminal device, and a request that the second base station transmit a paging message for the terminal device, initiating transmission by the second base station of a paging message for the terminal device.

The method may further comprise, responsive to a determination that no response to the paging message has been received by the second base station, initiating transmission by the second base station of a second paging request message to at least a third base station, wherein the second paging request message comprises an indication of the identity of the terminal device, and a request that the third base station transmit a paging message for the terminal device.

The step of initiating transmission of a second paging request message may comprise initiating transmission of the second paging request message to a plurality of neighbour base stations of the second base station.

The step of initiating transmission of a second paging request message may comprise initiating transmission of the second paging request message to all neighbour base stations of the second base station. Alternatively, the step of initiating transmission of a second paging request message may comprise initiating transmission of the second paging request message to all neighbour base stations of the second base station apart from the first base station.

In a further aspect, the present disclosure provides a network node of a wireless telecommunication network, the network node being configured to: initiate transmission, by a first base station, of a paging message for a terminal device; and initiate transmission by the first base station of a paging request message to a second base station. The paging request message comprises an indication of an identity of the terminal device, and a request that the second base station transmit a paging message for the terminal device.

In a yet further aspect, the present disclosure provides a network node of a wireless telecommunication network, the network node being configured to: responsive to receipt, by a second base station, of a paging request message from a first base station, wherein the paging request message comprises an indication of an identity of a terminal device, and a request that the second base station transmit a paging message for the terminal device, initiate transmission by the second base station of a paging message for the terminal device.

In a further aspect, the disclosure provides a network node of a wireless telecommunication network, the network node comprising a processor and a memory containing instructions executable by the processor, whereby the network node is operative to: initiate transmission, by a first base station, of a paging message for a terminal device; and initiate transmission by the first base station of a paging request message to a second base station. The paging request message comprises an indication of an identity of the terminal device, and a request that the second base station transmit a paging message for the terminal device.

In a further aspect, the disclosure provides a network node of a wireless telecommunication network, the network node comprising a processor and a memory containing instructions executable by the processor, whereby the network node is operative to: responsive to receipt, by a second base station, of a paging request message from a first base station, wherein the paging request message comprises an indication of an identity of a terminal device, and a request that the second base station transmit a paging message for the terminal device, initiate transmission by the second base station of a paging message for the terminal device.

In a yet further aspect, the disclosure provides a network node of a wireless telecommunication network, the network node comprising: a first module configured to initiate transmission, by a first base station, of a paging message for a terminal device; and a second module configured to initiate transmission by the first base station of a paging request message to a second base station. The paging request message comprises an indication of an identity of the terminal device, and a request that the second base station transmit a paging message for the terminal device.

In a further aspect, the disclosure provides a network node of a wireless telecommunication network, the network node comprising: a first module configured to, responsive to receipt, by a second base station, of a paging request message from a first base station, wherein the paging request message comprises an indication of an identity of a terminal device, and a request that the second base station transmit a paging message for the terminal device, initiate transmission by the second base station of a paging message for the terminal device.

It should be noted that, although the methods and apparatus set forth are described largely in the context of LTE and the system architecture evolution (SAE), the concepts disclosed herein are in no way limited to LTE or the SAE, and are applicable to any wireless communication system.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
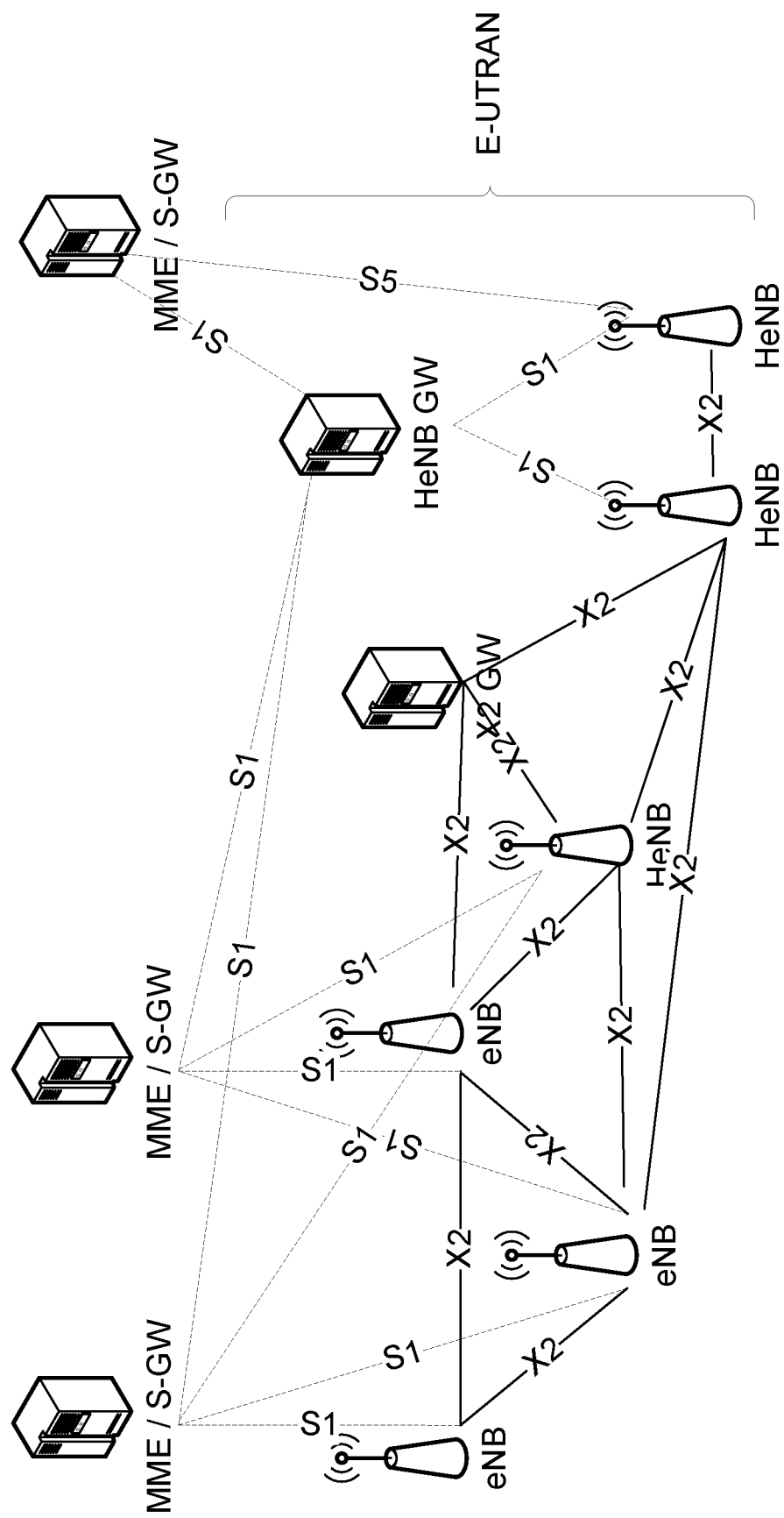
FIG. 1 is a schematic drawing of the LTE architecture.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Although the terms "wireless device" or "terminal device" may be used in the description, it is noted that these terms encompass other terms used to denote wireless devices, such as user equipment (UE). It should be understood by the person skilled in the art that "UE" is a non-limiting term comprising any mobile or wireless device or node equipped with a radio interface allowing for at least one of: transmitting signals in uplink (UL), receiving and/or measuring signals in downlink (DL), and transmitting and/or receiving signals in a D2D/sidelink mode. A wireless device herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "wireless device" or "UE", the terms "mobile device" and "terminal device" may be used interchangeably in the description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, Universal Mobile Telecommunications System (UMTS), Long-Term Evolution, LTE, etc.

It should be noted that use of the term "wireless network node" as used herein can refer to a base station, such as an eNodeB, a network node in the RAN responsible for resource management, such as a radio network controller (RNC), or, in some cases, a core network node, such as a mobility management entity (MME), a ProSe function (ProSe-F) node or a ProSe Application Server. The term "base station" compasses NodeBs, eNodeBs and Home eNodeBs.

Figure 2:
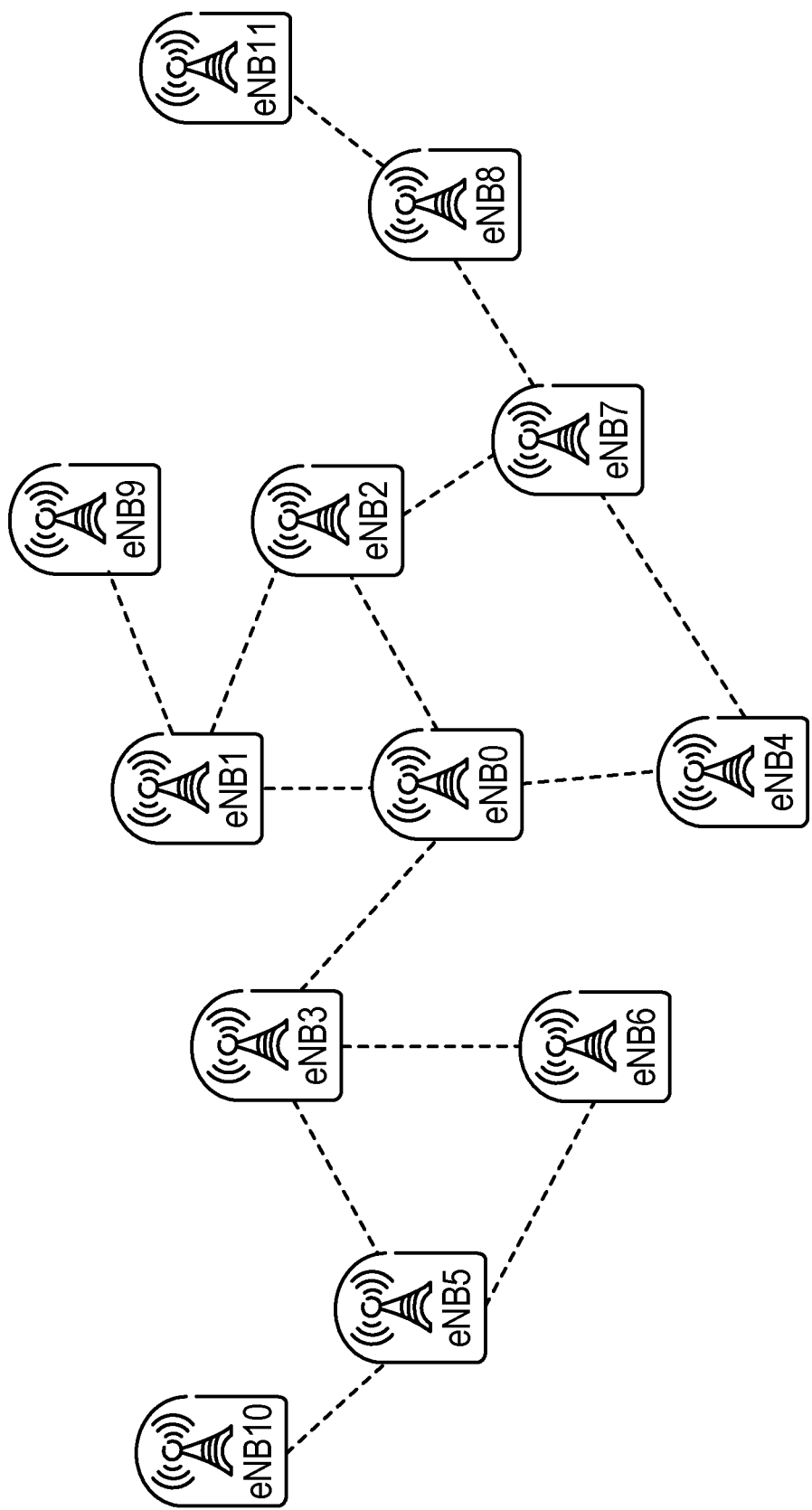
FIG. 2 is a schematic drawing of a wireless network according to examples of the disclosure.

FIG. 2 illustrates a wireless network (e.g. a RAN) with multiple base stations and their inter-relationships. A dashed line between two base stations indicates that those base stations are "neighbour" base stations. Neighbour base stations may have an interface between them, allowing transmission and reception of messages. For example, the interface may be a bi-directional X2 interface. Each base station is given a label eNBx, where x is an integer. However, this should not be taken as an indication that the base stations must be eNBs, or that the invention is applicable only to LTE and its related system architecture.

In the illustrated example, the neighbouring relationships are as follows:
eNB0 is neighbour to eNB1, eNB2, eNB3 and eNB4
eNB1 is neighbour to eNB0, eNB2 and eNB9
eNB2 is neighbour to eNB0, eNB1 and eNB7
eNB3 is neighbour to eNB0, eNB5 and eNB6
eNB4 is neighbour to eNB0 and eNB7
eNB5 is neighbour to eNB3, eNB6 and eNB10
eNB6 is neighbour to eNB3 and eNB5
eNB7 is neighbour to eNB2, eNB4 and eNB8
eNB8 is neighbour to eNB7 and eNB11
eNB9 is neighbour to eNB1
eNB10 is neighbour to eNB5
eNB11 is neighbour to eNB8

Figure 3A:
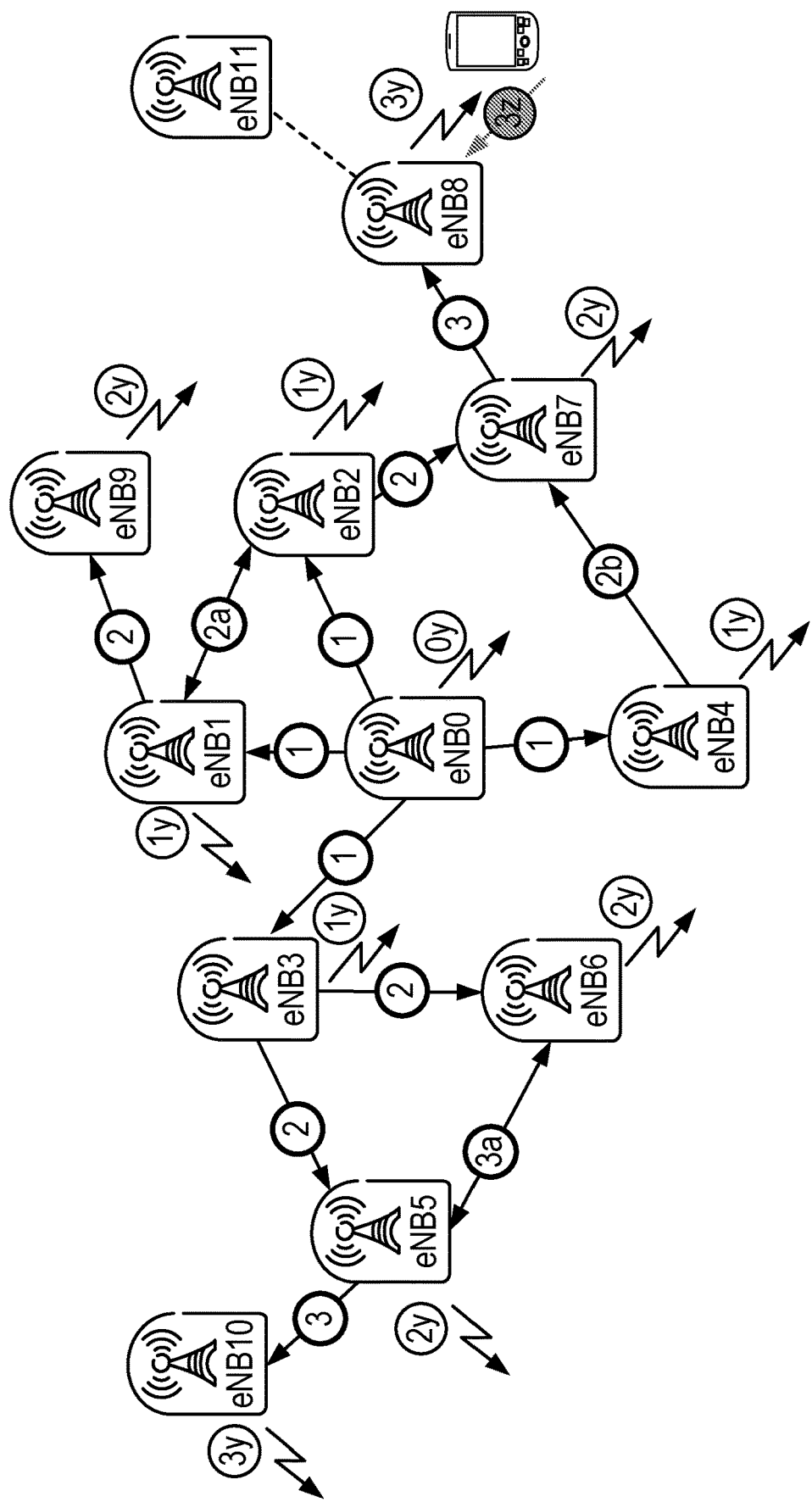
FIG. 3a shows an example sequence of steps in the transmission and retransmission of messages relating to paging.
Figure 3B:
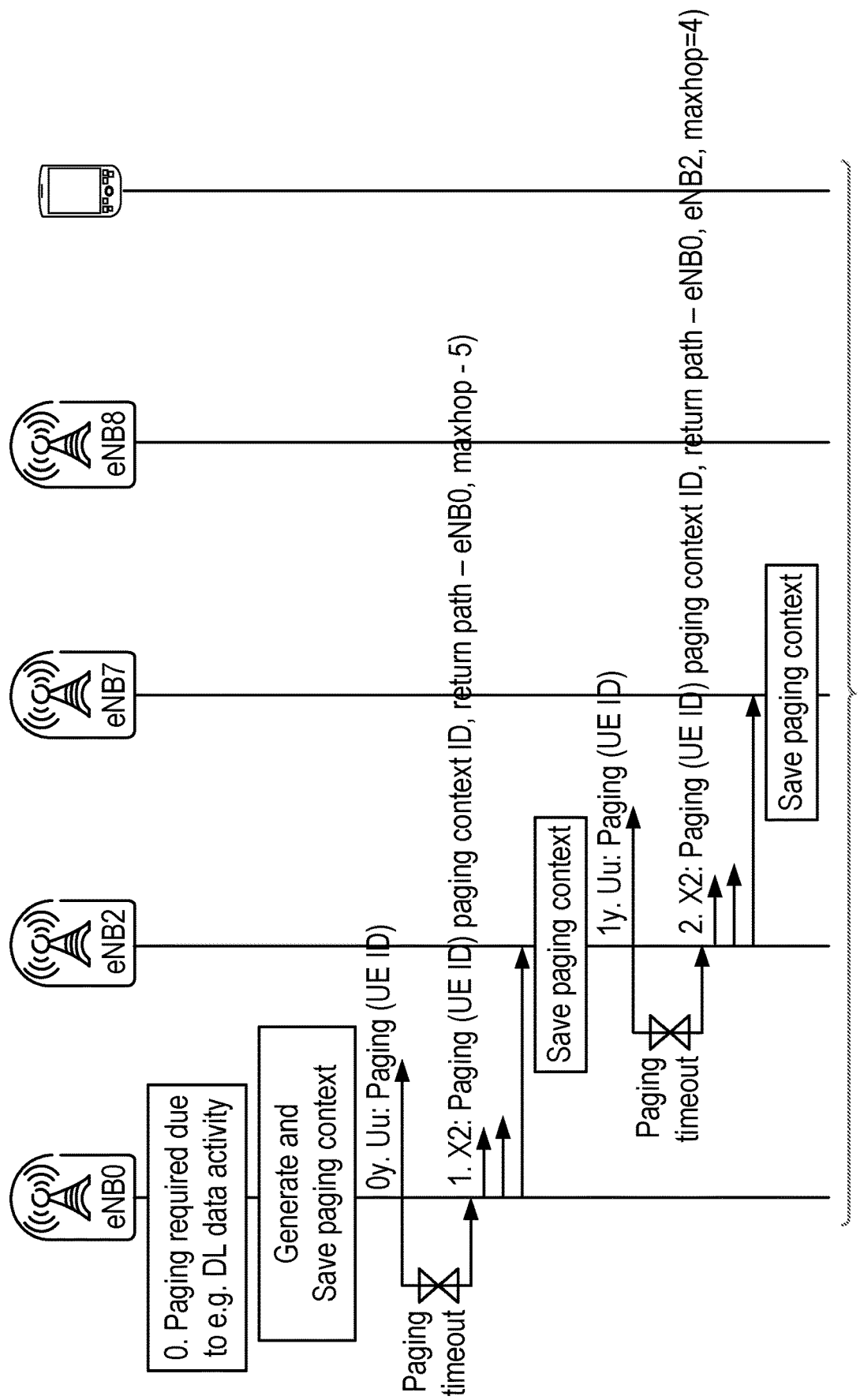
FIGS. 3ba and 3bb show a signalling diagram for the example of FIG. 3a in more detail.
Figure 3B:
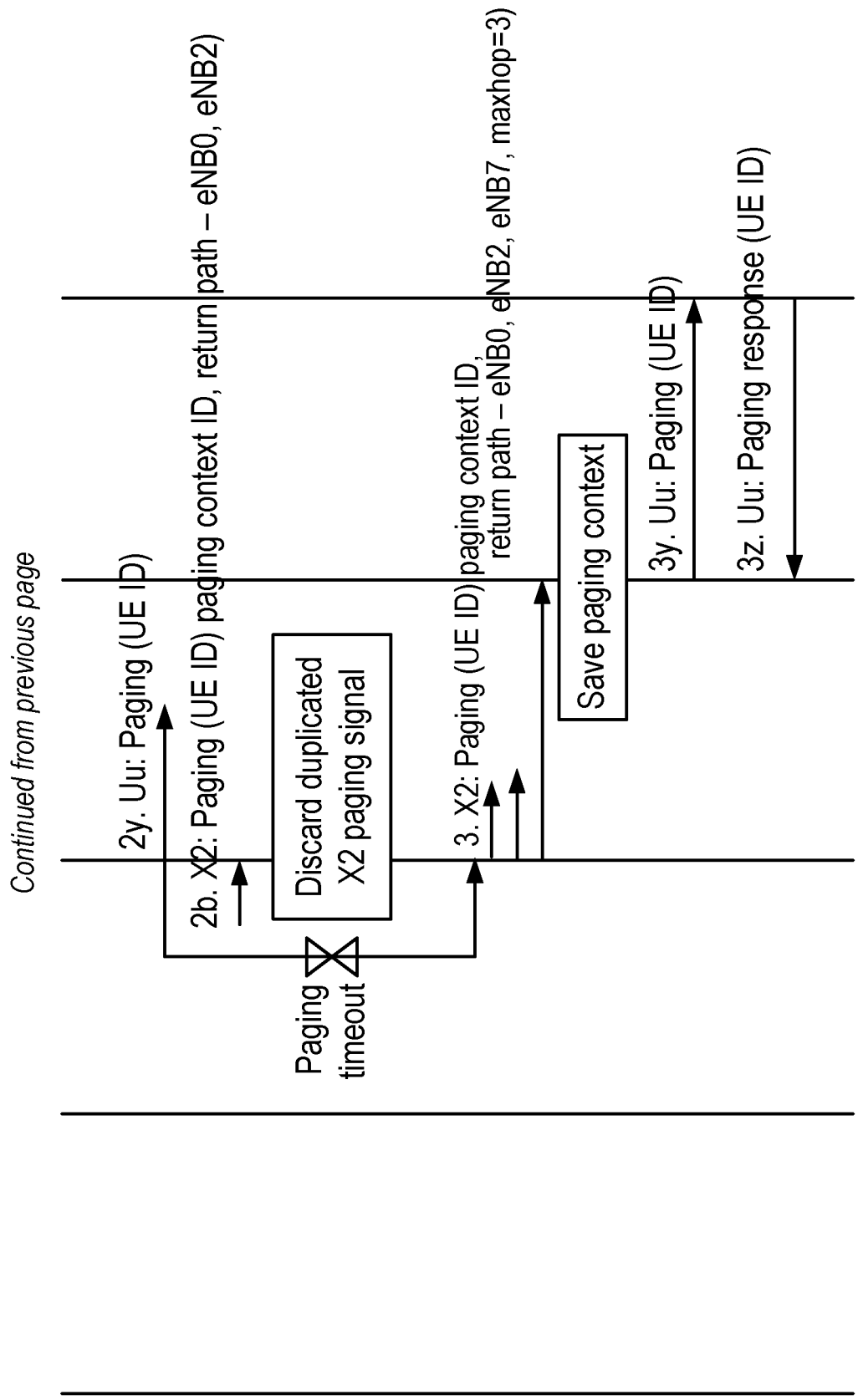

FIG. 3a shows an example sequence of steps in the transmission and retransmission of messages relating to the paging of a UE in the wireless network. Each step is given a separate reference numeral as described below. The same reference numeral may appear multiple times if the step corresponding to that reference numeral involves actions being carried out by multiple entities. FIGS. 3ba and 3bb show in more detail the signals that are transmitted at each step.

In one example, a UE is initially registered with eNB0 when, for example, it enters an inactive RRC state. As noted above, such an RRC state involves the UE being in a connected state with respect to the core network (e.g. EPC Connected state), and in a state similar to idle at RRC level. In this state the UE will not be paged by the CN because the UE is in connected mode with respect to the CN. Upon the transition to the inactive state, eNB0 may implement storage of the RRC state information for the UE at eNB0 or a connected server, to enable the rapid resumption of RRC signalling once the UE transitions out of the inactive state to, for example, the connected state.

The RRC state information may comprise information concerning bearers to be activated for the UE, security parameters to be used for the UE connection, UE capabilities information, UE mobility restriction information, etc.

In another example, the UE may be in an idle state. In such a state, the connection between the CN and eNB0 for the UE may also be idle.

In either example, a problem occurs when the UE moves out of the coverage area of eNB0. If the UE is in the inactive state (in which the control layer connection with eNB0 is suspended), eNB0 is not informed of the movements of the UE. If the UE is in the idle state, neither the CN nor eNB0 is informed of the movements of the UE.

Step 0 eNB0 determines that it is necessary to transmit a paging message to the UE. For example, there may be downlink (DL) data that is available for transmission to the UE (e.g. if the UE is in the inactive state), or it may be determined that eNB0 received a paging request message identifying the UE from a CN node (such as MME or S-GW), e.g. if the UE is in the idle state. In response, eNB0 generates and saves (i.e. stores in memory that is local to, or remote from eNB0) a paging context identity (ID). The paging context ID is a number (e.g. a random number) that is unique to the paging context, i.e. the requirement that this particular UE be paged at this particular time. Note that the paging context ID is not unique to the UE itself, but to the particular paging of the particular UE. For example, the same UE may be paged at a different time, with a paging context ID that will in general be different. eNB0 may additionally store an indication—associated with or linked to the paging context ID—that it is the originating eNB for the particular paging context. In one example, the paging context ID may comprise a first part that contains an identifier for the originating eNB (i.e. an identifier for eNB0), and at least a second part that contains a random number. The random number may contain a number of bits such that it can be considered as unique for each context.

Step 0y In response to a determination that it is necessary to page the UE, eNB0 transmits over the one or more cells that it serves a wireless paging message for the UE. The paging message is transmitted over the radio interface (e.g. Uu) between eNB0 and its wireless devices. The paging message may contain an indication of the identity of the UE (UE ID). In one example, the UE ID may be provided to the eNB by the CN. The UE ID could be a so-called S-TMSI (SAE Temporary Mobile Subscriber Identity) or equivalent thereof, or any other parameter that can identify the UE within the cluster of nodes participating in the methods described herein. eNB0 may transmit multiple such paging messages in an effort to locate the UE.

Step 1 As the UE has moved out of the coverage area of eNB0, the paging message is not received by the UE and no response is received by eNB0. It may be determined that no paging response is received if no paging response is received within a certain time frame of the transmission of the paging message. As noted above, eNB0 may transmit multiple paging messages, and it may be determined that no paging response is received if no paging response is received to any of the transmitted paging messages. In response to the determination that no response is received by eNB0, eNB0 transmits a paging request message to a neighbour eNB through the X2 interface or equivalent interface. In one example, eNB0 transmits a paging request message to each of its neighbour eNBs through the X2 interface or equivalent interface. The paging request message may include one or more of: UE ID, paging context ID, a return path and maximum "hop" (e.g. in the illustrated embodiment, 5).

The UE ID is the same as that transmitted in the paging message in step 0y. The paging context ID is the same as that generated and saved in step 0. The return path may contain a list of all eNBs or other radio network nodes that have previously handled the paging request message. A global eNB ID or equivalent parameter may be used to uniquely identify the eNB within the cluster of RAN nodes taking part in the methods described herein. The list may be arranged in an order in which the eNB handled the paging request message. However, at this point, only eNB0 has handled the paging request and therefore the return path contains only an identifier for eNB0. A global eNB ID or equivalent parameter may be used to uniquely identify the eNB within the cluster of RAN nodes taking part in the methods described herein. In some examples, the return path parameter is not required (see FIGS. 5a and 5b below).

The maximum hop parameter lists the number of further re-transmissions of the paging request message that is permitted for the given paging context. Further description of the utility of this parameter will be given below. In one embodiment the maximum number of hops may be determined by eNB0 (or a server connected to eNB0) in reference to the set of eNBs in the tracking area indicator (TAI) list for the particular paged UE. For example, the number may be set such that all of the eNBs in the TAI list can be reached from the originating eNB (i.e. eNB0) using the maximum number of hops. Alternatively to the maximum hop parameter (or additionally to that parameter), the paging request message may include the TAI list for the paged UE.

In further embodiments, eNB0 may transmit the paging request message at an earlier stage, e.g. upon the determination in step 0 that it is necessary to page the UE. In such embodiments, the paging request message may be transmitted before the paging message itself, or simultaneously with the paging message, or before any determination that no response has been received to the paging message. In this way, latency in paging the UE may be reduced at the cost of additional traffic over the network. If the UE responds to the paging message transmitted by eNB0, then the paging request message has no utility and represents wasted resources. However, if the UE does not respond, then time will be saved in waiting for the response.

Step 1y After receiving the paging request message from eNB0, each of eNB1, eNB2, eNB3 and eNB4 saves (i.e. stores in memory) the paging context ID, and performs paging over the radio interface of their respective cells for the paged UE. As noted in step 0y, this involves the transmission of a paging message to their respective cells. The paging message may contain the UE ID. In FIGS. 3*ba* and 3*bb*, only the activity of eNB2 is shown for clarity.

Step 2 As the UE is not in the coverage areas of any of eNB1, eNB2, eNB3 or eNB4, none of the paging messages are received by the UE and no response is received by any of the base stations. As before, it may be determined by each of the base stations that no paging response is received if no paging response is received within a certain time frame of the transmission of the paging message. The base stations may also transmit multiple paging messages before concluding that no response has been received. In response to that determination, eNB1, eNB2, eNB3 and eNB4 each transmit a respective paging request message to at least one of their respective neighbour eNBs (e.g. through the X2 interface). In one example, the respective paging request messages are transmitted to all of their respective neighbour eNBs. In a yet further example, the respective messages are transmitted to all of their respective neighbour eNBs, with the exception of the eNB from which the previous paging request message was received (i.e. eNB0 in the illustrated example).

The paging request messages may contain the same UE ID and paging context ID as the paging request message transmitted in step 1. However, the maximum "hop" is decremented by 1 (in the illustrated example, such that it now equals 4). Thus the number of hops in the paging request message is equal to the number of further transmissions that are permitted by different eNBs. Further, the return path parameter is increased to list both the eNBs listed in the paging request message received by the eNBs (i.e. eNB0) and the eNBs that transmit paging request messages in step 2. Therefore each of the paging request messages transmitted in step 2 contains a return path listing eNB0 and one of eNB1, eNB2, eNB3 and eNB4.

As before, in further embodiments the paging request messages may be transmitted by eNB1 and eNB2 without waiting to determine whether the UE has responded to the paging message. The paging request messages may be transmitted before the paging message, concurrently with the paging message, or before any determination that no response has been received. In such embodiments, the paging request messages may be propagated throughout the network based on the maximum number of hops, regardless of whether the UE responds to any paging messages that have been transmitted.

Step 2a As eNB1 and eNB2 are neighbours to each other, each may receive a paging request signal from the other, transmitted in step 2. Each of eNB1 and eNB2 may compare the paging context ID in the received message to a list of paging context IDs stored in memory, corresponding to paging contexts that the eNBs have previously handled. As eNB1 and eNB2 have each received the a paging request message corresponding to the paging context before (identified by the paging context ID), the incoming paging request message transmitted in step 2 is discarded.

Step 2b eNB7 is a neighbour to both eNB2 and eNB4, and therefore it receives duplicate paging request messages from those eNBs. In the event of duplicated paging request signals being received at the same time, or substantially the same time, only one of the paging request signals may be selected for action and the other is discarded. In the illustrated example, the paging request message from eNB2 is chosen, and the paging request message from eNB4 is discarded.

Step 2y After receiving the paging request message from one of eNB1, eNB2, eNB3 and eNB4, each of eNB5, eNB6, eNB7 and eNB9 saves (i.e. stores in memory) the paging context ID, and performs paging over the radio interface of their respective cells for the paged UE. As noted in steps 0y and 1y, this involves the transmission of a paging message to their respective cells. The paging message may contain the UE ID. In FIGS. 3ba and 3bb, only the activity of eNB7 is shown for clarity.

Step 3 This step is substantially similar to step 2. As the UE is not in the coverage areas of any of eNB5, eNB6, eNB7 or eNB9, none of the paging messages are received by the UE and no response is received by any of the base stations. In response to that determination, each of eNB5, eNB6, eNB7 and eNB9 transmits a paging request message to their neighbour eNBs (e.g. through X2 interface or equivalent interface). The paging request messages may contain the same UE ID and paging context ID, while the maximum "hop" count is again decremented by 1 (e.g. such that in the illustrated embodiment it becomes equal to 3), and the return path is increased to include the identity of the base station transmitting the paging request message (e.g. one of eNB5, eNB6, eNB7 and eNB9). Again, in alternative embodiments the paging request message may be transmitted regardless of whether or not the UE responds to the paging message.

Step 3a As eNB5 and eNB6 are neighbours to each other, each may receive a paging request signal from the other, transmitted in step 3. As in step 2a (with respect to eNB1 and eNB2), the incoming paging request message transmitted in step 3 may be discarded or ignored by comparing the paging context ID in the incoming message to the list of saved paging context IDs that the eNBs have previously handled.

Step 3y This step is similar to steps 1y and 2y. After receiving the paging request message from eNB5 and eNB7 respectively, eNB10 and eNB8 save (i.e. store in memory) the paging context ID, and perform paging over the radio interface of their respective cells for the paged UE. As noted in steps 0y, 1y and 2y this involves the transmission of a paging message to their respective cells. The paging message may contain the UE ID. In FIGS. 3ba and 3bb, only the activity of eNB8 is shown for clarity.

Step 3z The inactive UE is located in the coverage area of eNB8, and therefore receives the paging message from eNB8. In response, the UE transmits a paging response message through the radio interface (e.g. Uu interface) to eNB8. This Paging response message may be "RRC Resume Request" message or an equivalent message that the UE can use to initiate a transition from the inactive state to the connected state.

Thus FIGS. 3a, 3ba and 3bb show an example of the propagation of a paging request message through a wireless network, until the UE that is the subject of the paging request message is found. Once the UE has responded to the paging request from eNB8, it is desirable to inform the originating base station (i.e. eNB0) of this fact and trigger a "handover" procedure that enables the UE to communicate with the base station in whose cell it is now located (i.e. eNB8). Additionally, in order to reduce the paging resource usage over the radio air interface, it is desirable to stop ongoing paging for the UE in the network now the UE has been located.

Figure 4A:
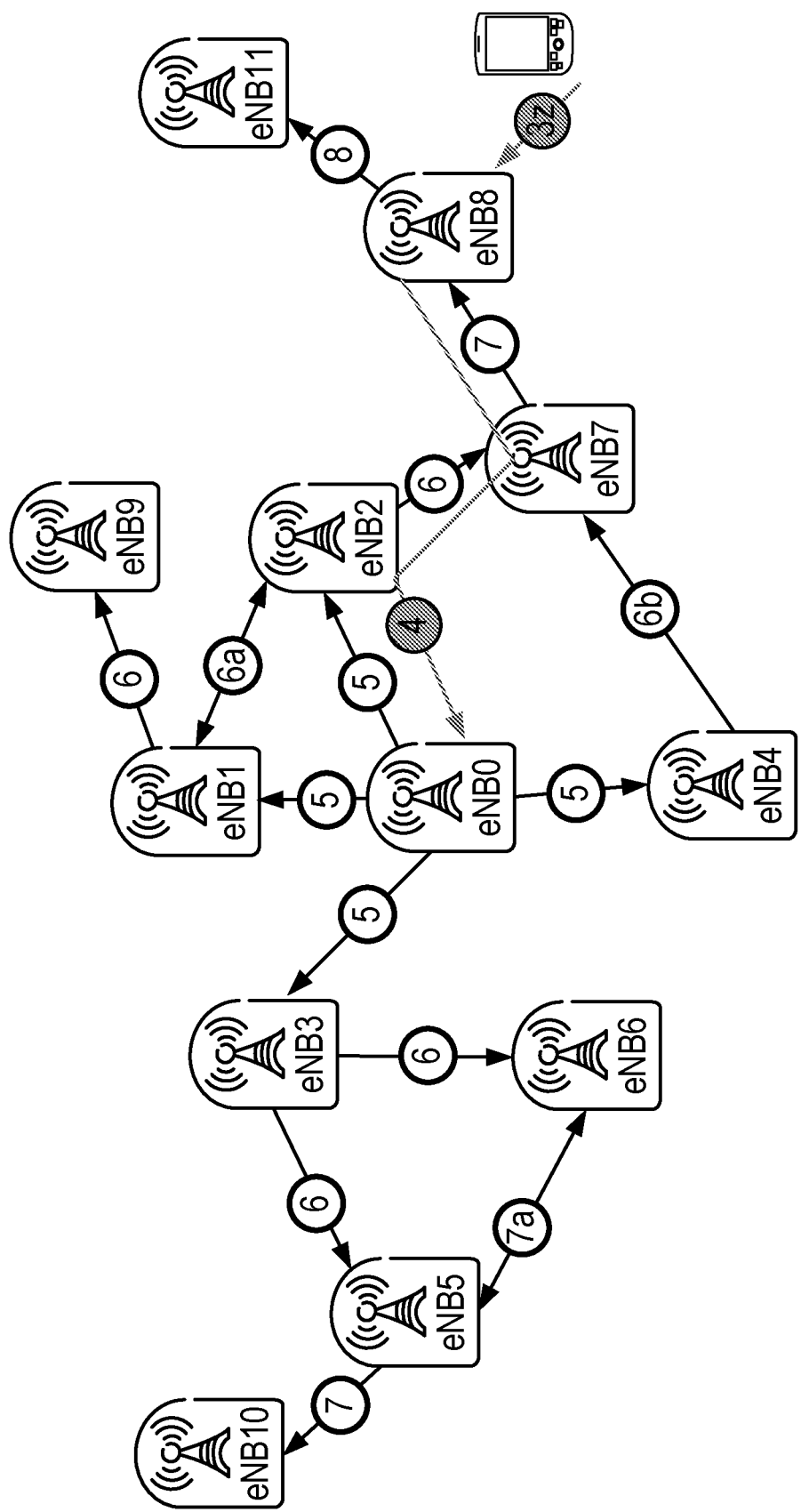
FIG. 4a shows an example sequence of steps in the transmission and retransmission of messages relating to paging.
Figure 4B:
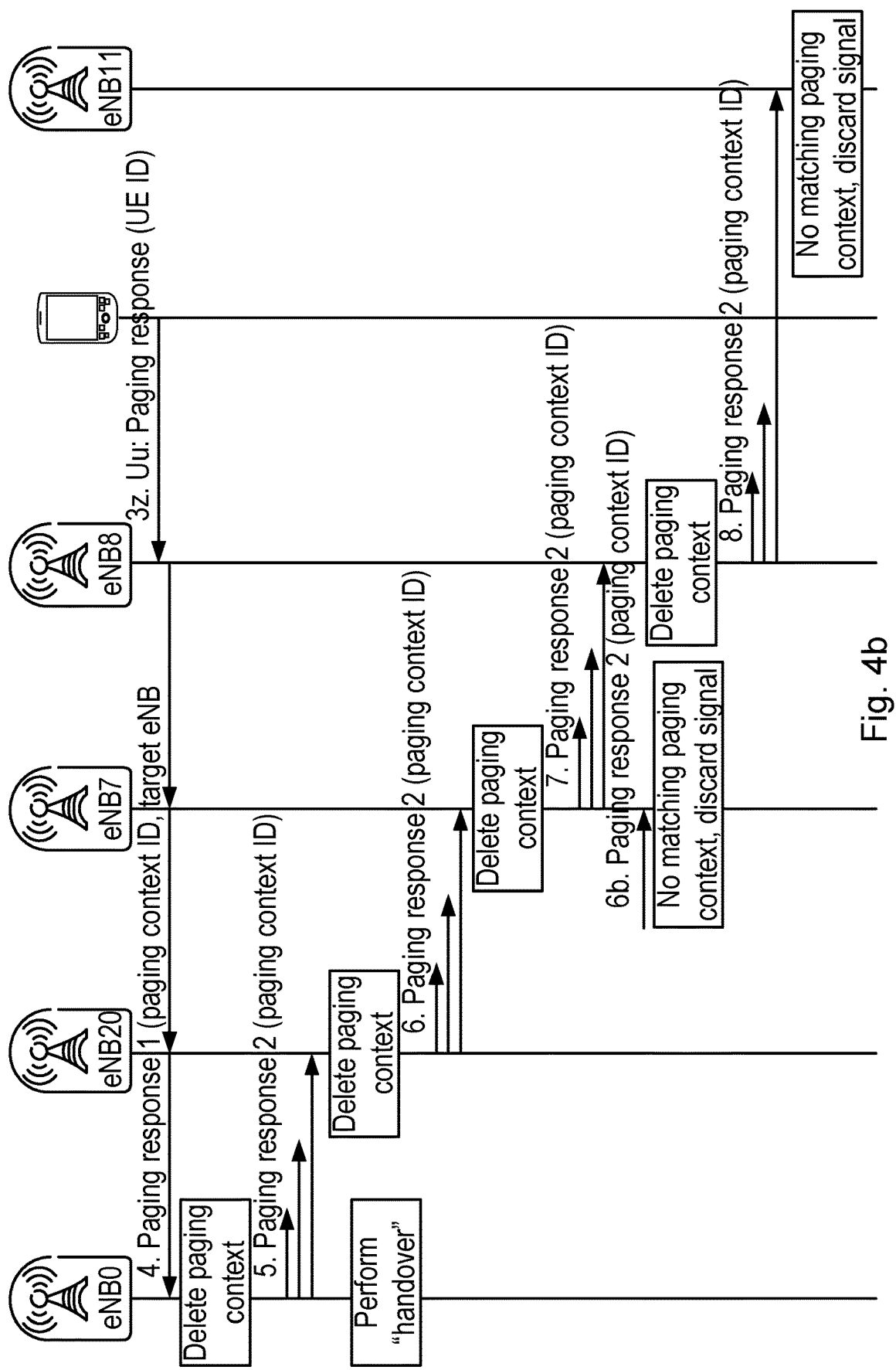
FIG. 4b is a signalling diagram showing the example of FIG. 4a in more detail.

FIGS. 4a and 4b show an example of how that may be achieved. FIG. 4a shows an example sequence of steps in the transmission and retransmission of messages in the wireless network, while FIG. 4b shows in more detail the signals that are transmitted at each step.

Step 3z The inactive UE is located in the coverage area of eNB8, and therefore receives the paging message from eNB8. In response, the UE transmits a paging response message through the radio interface (e.g. Uu interface) to eNB8. This Paging response message may be "RRC Resume Request" message or an equivalent message that the UE can use to initiate a transition from the inactive state to the connected state.

Step 4 eNB8 transmits a paging response message to eNB0 (e.g. through the X2 interface or equivalent interface), using the return path parameter from the paging request message received in step 3. The paging response message may be of a first type or contain an instruction such that the receiving eNB knows that it is to transmit the message on to the next eNB in the return path. That is, the return path parameter contains a list of all eNBs that have previously handled paging request messages corresponding to the given paging context ID. The eNBs may be arranged in order, such that eNB8 can transmit directly to the most recent eNB in the list (i.e. eNB7). eNB7 likewise transmits the paging response message to the most recent eNB in the list (after its own identity), and so on until the paging response message reaches the base station from which the paging context originated, i.e. eNB0. The paging response message may contain the return path itself (such that each eNB is informed of the next eNB in the chain from the message itself), or the eNBs may store the return path together with the paging context ID upon receipt of a new paging request message. The paging response message may comprise the paging context ID, and also an indication of the identity of the node which received the response from the UE, i.e. eNB8, or the identity of a cell served by that node in which the UE is located.

Step 5 In order to stop the ongoing paging hops, eNB0 transmits a paging response message to its neighbour base stations, i.e. eNB1, eNB2, eNB3 and eNB4 (e.g. through the X2 interface or equivalent interface). The paging response message may contain the paging context ID, and may also contain a maximum "hop" that is the same as the maximum number of hops in the paging request message transmitted in step 1. In some examples, however, the paging response message does not contain any number of hops. Alternatively to the maximum hop parameter (or additionally to that parameter), the paging request message may include the TAI list for the paged UE.

Additionally, eNB0 initiates a handover process to the node identified in the received paging response message (i.e. eNB8). The handover process may comprise transferring of the stored RRC state information from the originating base station to the base station (or cell) identified in the paging response message, e.g. via an X2 interface or any other suitable interface.

Step 6 The paging response message transmitted in step 5 may be of a type (different to the type of paging response message transmitted in step 4) or contain an instruction such that the receiving base stations handle the message differently to the message transmitted in step 4. eNB1, eNB2, eNB3 and eNB4 each receive the paging response message and check the paging context ID contained in the message against those stored in memory for the eNB. If the paging context ID is stored in the memory, the eNBs stop any on-going paging messages for the UE associated with the paging context ID that may be scheduled for future transmission (if there are any) and delete the saved paging context ID from their respective memories. Further, the eNBs transmit respective paging response messages to their neighbour eNBs (e.g. through the X2 interface or equivalent interface). These paging response messages may contain the same paging context ID. In examples in which the messages contain a hop count, and the hop count is decremented by 1 (e.g. such it equals 4 in the illustrated embodiment).

Step 6a As eNB1 and eNB2 are neighbours to each other, each may receive a paging response signal from the other, transmitted in step 6. Each of eNB1 and eNB2 may compare the paging context ID in the received message to a list of paging context IDs stored in memory, corresponding to paging contexts that the eNBs have previously handled. As the paging context IDs were deleted in step 6, the paging context IDs will not be present, and eNB1 and eNB2 can each discard or ignore the incoming paging response message.

Step 6b eNB7 is a neighbour to both eNB2 and eNB4, and therefore it receives duplicate paging response messages from those eNBs. In the event of duplicated paging response signals being received at the same time, or substantially the same time, only one of the paging response signals may be selected for action and the other may be discarded or ignored. In the illustrated example, the paging response message from eNB2 is chosen, and the paging response message from eNB4 is discarded.

Step 7 eNB5, eNB6, eNB7 and eNB9 each receive the paging response message and check the paging context ID contained in the message against those stored in memory for the eNB. If the paging context ID is stored in the memory, the eNBs stop any on-going paging messages for the UE associated with the paging context ID that may be scheduled for future transmission (if there are any) and delete the saved paging context ID from their respective memories. Further, the eNBs transmit respective paging response messages to their neighbour eNBs (e.g. through the X2 interface or equivalent interface). These paging response messages may contain the same paging context ID. In examples in which the messages contain a hop count, and the hop count is decremented by 1 (e.g. such it equals 3 in the illustrated embodiment).

Step 7a As eNB5 and eNB6 are neighbours to each other, each may receive a paging response signal from the other, transmitted in step 7. As in step 6a (with respect to eNB1 and eNB2), the incoming paging response message transmitted in step 7 may be discarded or ignored by comparing the paging context ID in the incoming message to the list of saved paging context IDs that the eNBs have previously handled (and finding the paging context ID absent from the list).

Step 8 eNB8 and eNB10 each receive the paging response messages transmitted in step 7, and stop any ongoing paging corresponding to the received paging context ID. eNB8 may have previously stopped transmitting paging messages on receipt of a paging response message from the UE. eNB8 and eNB10 may further transmit a paging response message to their respective neighbour eNBs (e.g. through X2 interface or equivalent interface). The paging response messages may contain the same paging context ID. In examples in which the messages contain a hop count, and the hop count is decremented by 1 (e.g. such it equals 2 in the illustrated embodiment). As eNB11 has never received a paging request message with the same paging context ID, this paging response message will be discarded by eNB11.

Figure 5A:
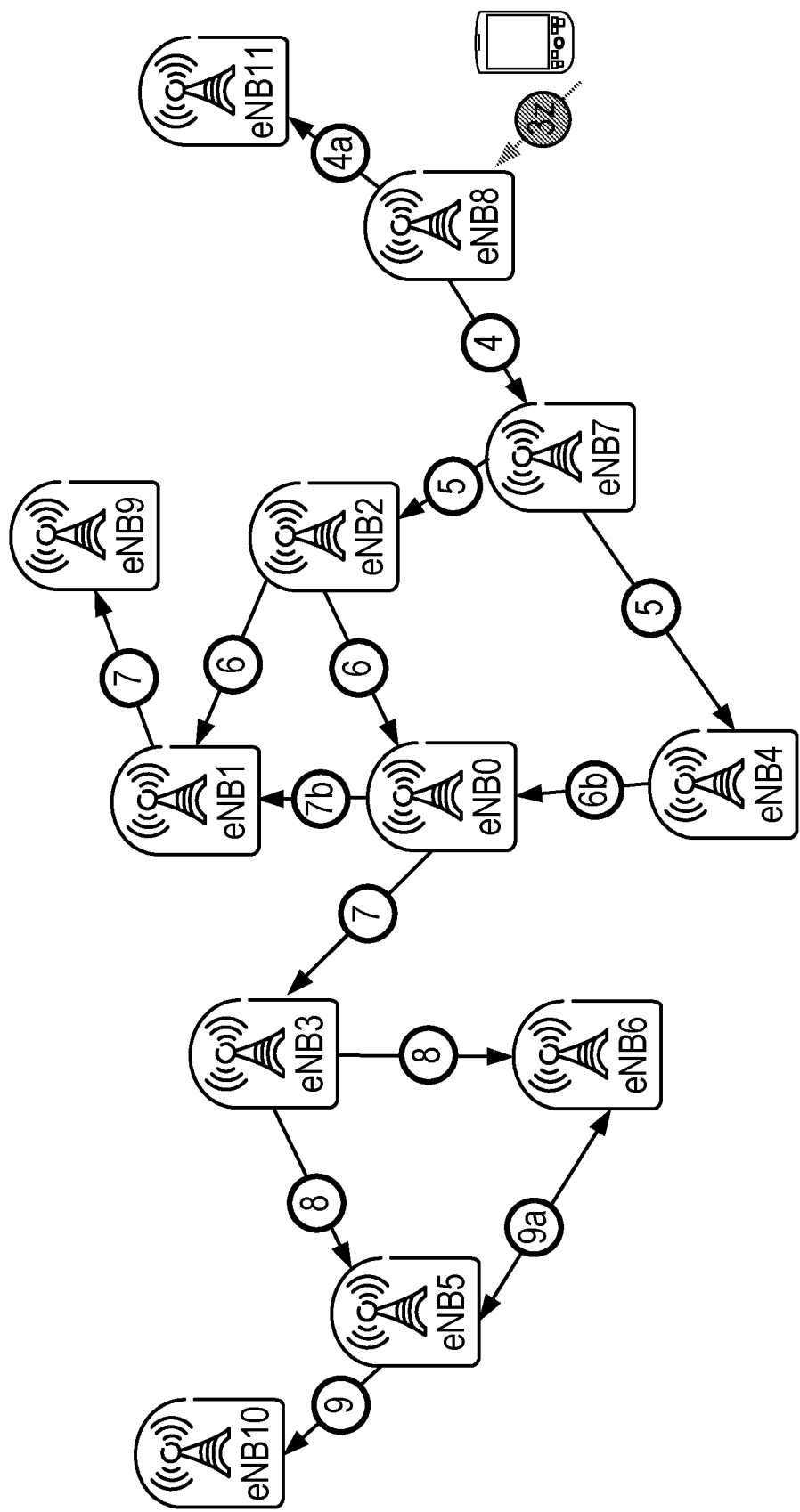
FIG. 5a shows an example sequence of steps in the transmission and retransmission of messages relating to paging.
Figure 5B:
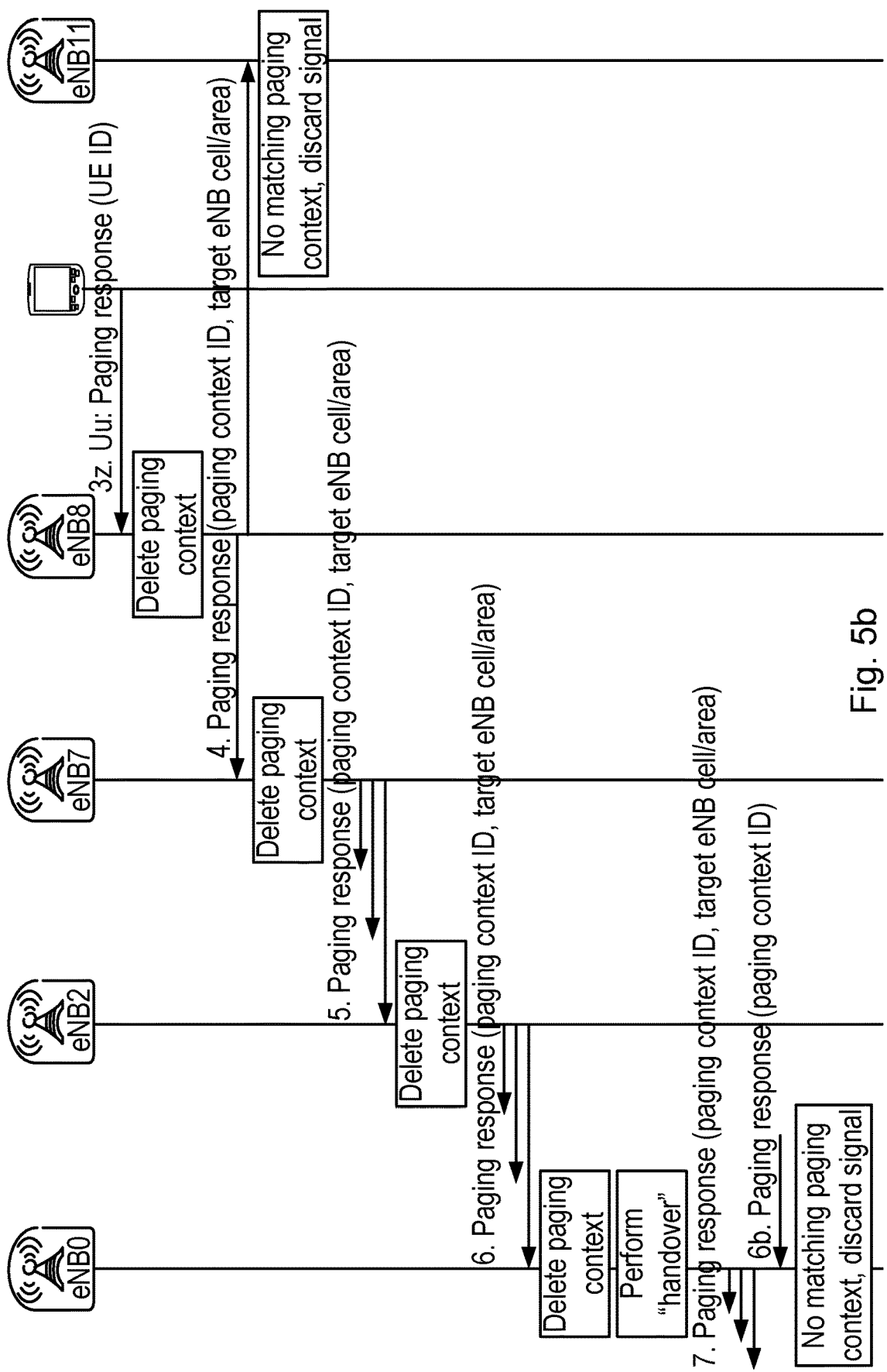
FIG. 5b is a signalling diagram showing the example of FIG. 5a in more detail.

Thus the paging response messages in the examples shown in FIGS. 4a and 4b propagate through the network in a manner that is substantially similar to that in which the paging request messages propagate through the network in FIGS. 3a, 3ba and 3bb. FIGS. 5a and 5b show an alternative example of how the originating base station (i.e. eNB0) may be informed that the UE has been located, and how ongoing paging transmissions can be halted. FIG. 5a shows an example sequence of steps in the transmission and retransmission of messages in the wireless network, while FIG. 5b shows in more detail the signals that are transmitted at each step. Note that the example shown in FIGS. 5a and 5b does not require the paging request messages sent, for example, in steps 0, 1, 2 and 3 to contain a "return path" parameter.

Step 3z The inactive UE is located in the coverage area of eNB8, and therefore receives the paging message from eNB8. In response, the UE transmits a paging response message through the radio interface (e.g. Uu interface) to eNB8. This Paging response message may be "RRC Resume Request" message or an equivalent message that the UE can use to initiate a transition from the inactive state to the connected state.

Step 4 eNB8 stops any on-going paging messages for the UE associated with the paging context ID (or with the UE ID) that may be scheduled for future transmission (if there are any), and transmits a paging response message to its neighbour eNBs (e.g. through the X2 interface or equivalent interface). The paging response message may contain the same paging context ID, and an indication of the identity of the eNB to which the UE responded (i.e. eNB8) and/or a cell that is served by that eNB and in which the UE is located.

Step 4a eNB11 is a neighbour eNB to eNB8. Upon receipt of the paging response message transmitted in step 4, eNB11 checks the paging context ID in the message against a list of stored paging context IDs that the eNB has previously handled and not deleted. As eNB11 has never received any paging request message with the paging context ID in question, the incoming paging response message is discarded or ignored.

Step 5 Upon receipt of the paging response message transmitted in step 4, eNB7 checks the paging context ID in the message against a list of stored paging context IDs that the eNB has previously handled and not deleted. As the paging context ID is in the list (i.e. eNB7 has previously handled paging requests corresponding to the indicated paging context), eNB7 deletes the paging context ID from its list, stops any on-going paging messages for the UE associated with the paging context ID (or with the UE ID) that may be scheduled for future transmission (if there are any), and transmits a paging response message to its neighbour eNBs (e.g. through the X2 interface or equivalent interface). The paging response message may contain the same paging context ID, and an indication of the identity of the eNB to which the UE responded (i.e. eNB8) and/or a cell that is served by that eNB and in which the UE is located.

Step 6 Upon receipt of the paging response message transmitted in step 5, eNB2 and eNB4 check the paging context ID in the message against their respective lists of stored paging context IDs that the eNBs have previously handled and not deleted. As the paging context ID is in each list, eNB2 and eNB4 each delete the paging context ID from their lists, stop any on-going paging messages for the UE associated with the paging context ID (or with the UE ID) that may be scheduled for future transmission (if there are any), and transmit respective paging response messages to their neighbour eNBs (e.g. through the X2 interface or equivalent interface). The paging response messages may contain the same paging context ID, and an indication of the identity of the eNB to which the UE responded (i.e. eNB8) and/or a cell that is served by that eNB and in which the UE is located.

Step 6b eNB0 is a neighbour to both eNB2 and eNB4, and therefore it receives duplicate paging response messages from those eNBs. In the event of duplicated paging response signals being received at the same time, or substantially the same time, only one of the paging response signals may be selected for action and the other may be discarded or ignored. In the illustrated example, the paging response message from eNB2 is chosen, and the paging response message from eNB4 is discarded.

Step 7 eNB0 and eNB1 compare the paging context ID in the received messages against their respective lists and, upon a determination that the paging context ID is contained in each list, delete the paging context ID from their lists, stop any on-going paging messages for the UE associated with the paging context ID (or with the UE ID) that may be scheduled for future transmission (if there are any), and transmit respective paging response messages to their neighbour eNBs (e.g. through the X2 interface or equivalent interface). The paging response messages may contain the same paging context ID, and an indication of the identity of the eNB to which the UE responded (i.e. eNB8) and/or a cell that is served by that eNB and in which the UE is located.

In addition, eNB0 may determine that it was the originating eNB for the paging context (e.g. from the indication stored in step 0, or the presence of the identifier for eNB0 in the paging context ID, etc). eNB0 initiates a handover process to the node identified in the received paging response message (i.e. eNB8). The handover process may comprise transferring of the stored RRC state information from the originating base station to the base station (or cell) identified in the paging response message, e.g. via an X2 interface or any other suitable interface.

Step 7b eNB1 is a neighbour base station to eNB0, and therefore receives a further paging response message (i.e. in addition to the one transmitted by eNB2 in step 6). As the paging context ID has been deleted from eNB1's list, however, the paging response message can be discarded or ignored.

Step 8 eNB3 and eNB9 compare the paging context ID in the received messages against their respective lists and, upon a determination that the paging context ID is contained in each list, delete the paging context ID from their lists, stop any on-going paging messages for the UE associated with the paging context ID (or with the UE ID) that may be scheduled for future transmission (if there are any), and transmit respective paging response messages to their neighbour eNBs (e.g. through the X2 interface or equivalent interface). The paging response messages may contain the same paging context ID, and an indication of the identity of the eNB to which the UE responded (i.e. eNB8) and/or a cell that is served by that eNB and in which the UE is located.

Step 9 eNB5 and eNB6 compare the paging context ID in the received messages against their respective lists and, upon a determination that the paging context ID is contained in each list, delete the paging context ID from their lists, stop any on-going paging messages for the UE associated with the paging context ID (or with the UE ID) that may be scheduled for future transmission (if there are any), and transmit respective paging response messages to their neighbour eNBs (e.g. through the X2 interface or equivalent interface). The paging response messages may contain the same paging context ID, and an indication of the identity of the eNB to which the UE responded (i.e. eNB8) and/or a cell that is served by that eNB and in which the UE is located.

Step 9a As eNB5 and eNB6 are neighbours to each other, each may receive a paging response signal from the other, transmitted in step 9. The incoming paging response message transmitted in step 9 may be discarded or ignored by comparing the paging context ID in the incoming message to the list of saved paging context IDs that the eNBs have previously handled and not deleted (and finding the paging context ID absent from the list).

Upon receipt of the paging response message transmitted by eNB5, eNB10 checks the paging context ID in the message against a list of stored paging context IDs that the eNB has previously handled and not deleted. As the paging context ID is in the list (i.e. eNB10 has previously handled paging requests corresponding to the indicated paging context), eNB10 deletes the paging context ID from its list, stops any on-going paging messages for the UE associated with the paging context ID (or with the UE ID) that may be scheduled for future transmission (if there are any), and transmits a paging response message to its neighbour eNBs (e.g. through the X2 interface or equivalent interface).

As there are no further eNBs in the network, that is the end of the process. However, if there were further eNBs in the network, it will be appreciated that the propagation of the paging response signal through the network would nonetheless come to an end once it had reached each of the eNBs that had previously handled paging request messages corresponding to the particular paging context ID. Other eNBs may ignore or discard the received paging response message, preventing its further propagation through the network.

Figure 6:
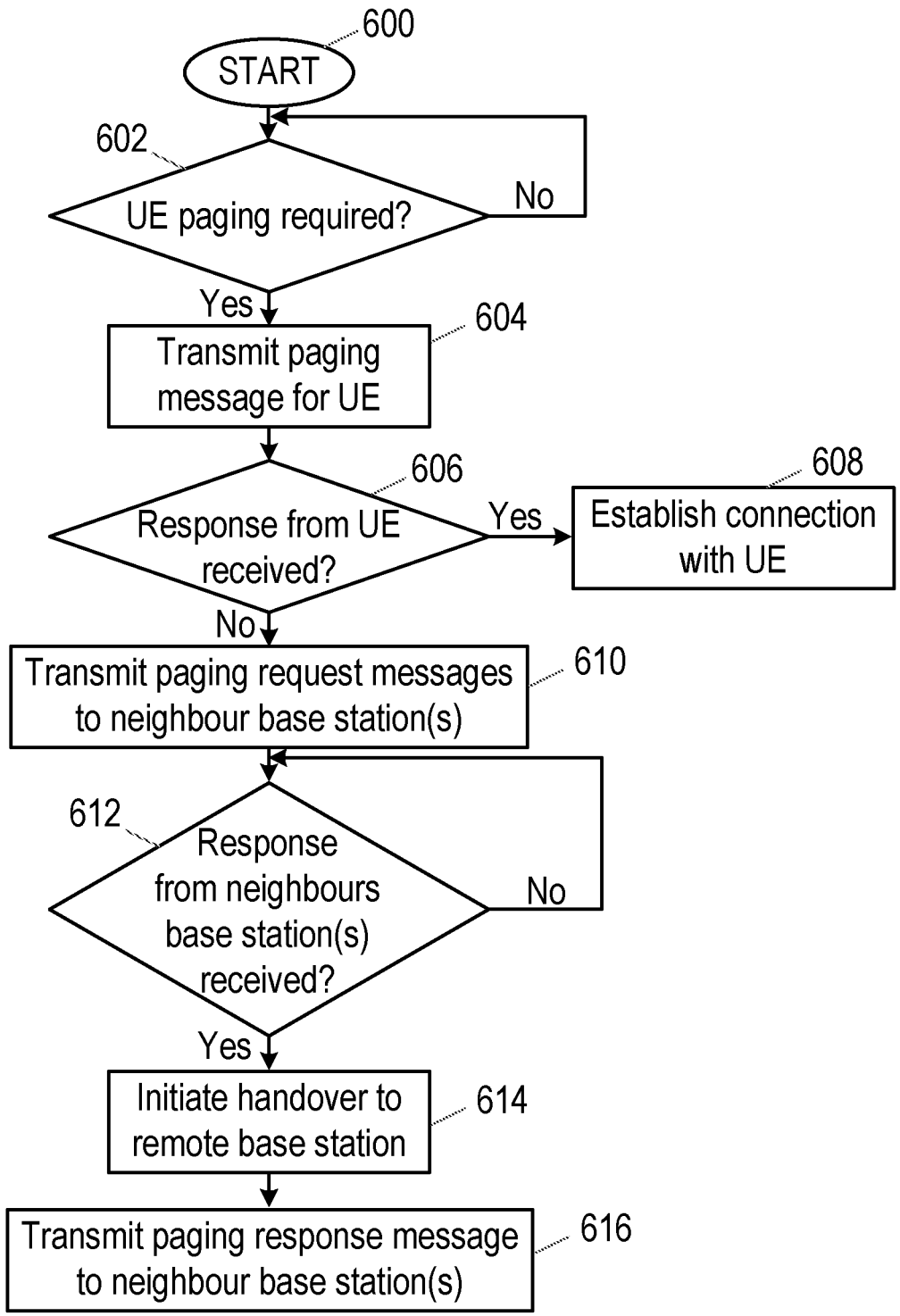
FIG. 6 is a flowchart of a method according to examples of the present disclosure.

FIG. 6 is a flow chart of a method in accordance with some examples. The method may be carried out in a network node, such as a base station, or in a server that is remote from a base station. The method relates to a process that is carried out in conjunction with a base station that originates a paging context as previously described. That is, the method may be carried out in eNB0, or in a server that is located remote from eNB0 (but nonetheless issues control instructions for eNB0 and obtains information from signals received by eNB0). The method starts in step 600.

In step 602, it is determined whether it is necessary to send a paging message for a particular UE. For example, there may be downlink (DL) data that is available for transmission to the UE (e.g. if the UE is in an inactive state), or a paging request message identifying the UE may be received from a CN node (such as MME or S-GW), e.g. if the UE is in an idle state. In either case, the CN considers that the UE is camped in a cell that is served by the base station. That may be the case; however, it may also be the case that the UE is in an inactive state (such that the control layer connection with the base station has been suspended) or an idle state (such that the connection between the base station and the core network is also idle).

In such a case, the base station may have previously stored (e.g. in memory local to or remote from the base station) the control layer state information (e.g. the RRC connection information) for the UE upon its transition to the inactive state. The UE control layer information may comprise information concerning bearers to be activated for the UE, security parameters to be used for the UE connection, UE capabilities information, UE mobility restriction information, etc.

If paging is not required, the method goes back to the start (i.e. before step 602), until paging for the UE is required. If paging is required for the UE, the method proceeds to step 604, in which a paging context ID is generated and stored (e.g. in a list in memory that is local or remote to the base station), and in which the base station transmits a paging message for the UE in the cells that it serves. The method may comprise a server remote from the base station sending a control instruction initiating transmission of such a paging message.

The paging context ID may be a number (e.g. a random number) that is unique to the paging context, i.e. the requirement that this particular UE be paged at this particular time. Note that the paging context ID is not unique to the UE itself, but to the particular paging of the particular UE. For example, the same UE may be paged at a different time, with a paging context ID that will in general be different. The base station may additionally store an indication—associated with or linked to the paging context ID—that it is the originating eNB for the particular paging context. In one example, the paging context ID may comprise a first part that contains an identifier for the originating base station (i.e. an identifier for the base station), and at least a second part that contains a random number. The random number may contain a number of bits such that it can be considered as unique for each context.

The paging message is transmitted over the radio interface (e.g. Uu) between the base station and its wireless devices. The paging message may contain an indication of the identity of the UE (UE ID). Multiple such paging messages may be transmitted in an effort to locate the UE.

In step 606, it is determined whether a response is received from the UE. For example, the base station may listen for a response within a time window of transmitting the paging message in step 604. If multiple paging messages are transmitted, the base station may listen for a response to each and any of the transmitted paging messages. Such a response may comprise, for example, a paging response message sent through the radio interface (e.g. Uu interface) to the base station. The paging response message may be "RRC Resume Request" message or an equivalent message that the UE can use to initiate a transition from the inactive state to the connected state.

If a response is received, in step 608 the base station re-establishes a connection with the UE. For example, the base station may use the stored control layer information to quickly resume control layer communications.

If no response is received to the paging message(s) transmitted in step 604, the method moves to step 610, in which the base station transmits a paging request message to a neighbour eNB (e.g. through the X2 interface or equivalent interface). In one example, the base station transmits a paging request message to each of its neighbour eNBs through the X2 interface or equivalent interface. The paging request message may include one or more of: UE ID, paging context ID, a return path, maximum "hops" and the TAI list for the UE.

The UE ID is the same as that transmitted in the paging message in step 604. The paging context ID is the same as that generated and saved in step 604. The return path may contain a list of all eNBs or other radio network nodes that have previously handled the paging request messages corresponding to the paging context ID. The list may be arranged in an order in which the eNBs handled the paging request messages corresponding to the paging context ID. As the base station is the originating node, the return path contains only an identifier for the base station. In some examples, the return path parameter is not required (see FIGS. 5*a* and 5*b* above).

The maximum hop parameter lists the number of further re-transmissions of the paging request message that is permitted for the given paging context. Further description of the utility of this parameter will be given below. In one embodiment the maximum number of hops may be determined by the base station (or a server connected to the base station) in reference to the set of base stations in the tracking area indicator (TAI) list for the particular paged UE. For example, the number may be set such that all of the base stations in the TAI list can be reached from the originating base station using the maximum number of hops. Alternatively to the maximum hop parameter (or additionally to that parameter), the paging request message may include the TAI list for the paged UE.

The neighbour base stations may respond to the paging request message(s) by transmitted their own respective paging messages and, potentially, their own respective paging request messages in the manner described above with respect to FIGS. 3*a*, 3*ba* and 3*bb*, and below with respect to FIG. 7. In step 612, the originating base station waits for responses from one or more of the neighbouring base stations. The originating base station may continue to transmit paging messages for the UE, in case the UE has temporarily entered a "coverage hole" and subsequently emerges from the coverage hole and receives a paging message. If that happens, the originating base station may establish a connection with the UE (substantially as described in step 608), and then take steps to halt the further transmission of paging messages and paging request messages by other base stations of the network. If no responses are received, step 612 is repeated until a response is received or a timeout occurs (for example). If a timeout occurs (i.e. the UE is not found), the method ends. The originating base station may additionally take some action to halt the further transmission of paging messages and paging request messages by other base stations of the network.

If a response message is received in step 612, the method proceeds to step 614. The response message may be a paging response message received from one of the neighbouring base stations to the originating base station. The paging response message may contain a paging context ID, and an indication of the identity of the node to which the UE responded and/or a cell that is served by that node and in which the UE is located. The node may be one of the neighbour base stations of the originating base station, or a node that is more remote (i.e. more than one "hop" away).

Upon receipt of the paging response message, the paging context ID may be checked against a list of paging context IDs stored by the base station. It is determined that the paging context ID was previously handled by the base station (as the paging context ID is located in the list), and additionally it is determined that the base station was the originating base station for that particular paging context.

In step 614, the base station initiates a handover process to the node identified in the received paging response message. In examples where the UE is in an inactive state, the handover process may comprise transferring of the stored UE control layer information from the originating base station to the base station (or cell) identified in the paging response message, e.g. via an X2 interface or any other suitable interface. In examples where the UE is in an idle state, the handover process may comprise transmitting control signals that transfer responsibility for the UE to the base station (or cell) identified in the paging response message, and remove responsibility for the UE from the originating base station.

The method proceeds to step 616 in which the originating base station transmits (or is controlled to transmit) one or more paging response messages to one or more of its neighbour base station(s), such that those neighbour base stations can halt transmission of further paging messages for that particular paging context. In one example (for example if the paging response message received in step 612 comes directly from the base station at which the UE is located, as in FIGS. 4a and 4b), the originating base station may transmit a paging response message to all of its neighbour base stations. The paging response message may contain the paging context ID, and may also contain a maximum "hop" that is the same as the maximum number of hops in the paging request message transmitted in step 610. In some examples, however, the paging response message does not contain any number of hops. Alternatively to the maximum hop parameter (or additionally to that parameter), the paging response message may include the TAI list for the paged UE. In a further alternative example (for example as that shown in FIGS. 5a and 5b), the originating base station may transmit a paging response message to all of its neighbour base stations, with the exception of the base station from which the paging response message was received in step 612. The paging response message may again contain the paging context ID. Note in particular that steps 614 and 616 may be performed simultaneously or in a different order.

As noted above, in further embodiments the base station may transmit one or more paging request messages (i.e. as in step 610) regardless of whether or not any response has been received to the paging message transmitted in step 604. For example, the paging request message may be transmitted before the paging message itself (i.e. before step 604), or simultaneously with the paging message (i.e. simultaneously with step 604), or before any determination that no response has been received to the paging message (i.e. before step 606). In this way, latency in paging the UE may be reduced at the cost of additional traffic over the network. If the UE responds to the paging message transmitted by the paging message, then the paging request message has no utility and represents wasted resources. However, if the UE does not respond, then time will be saved in waiting for the response.

Figure 7:
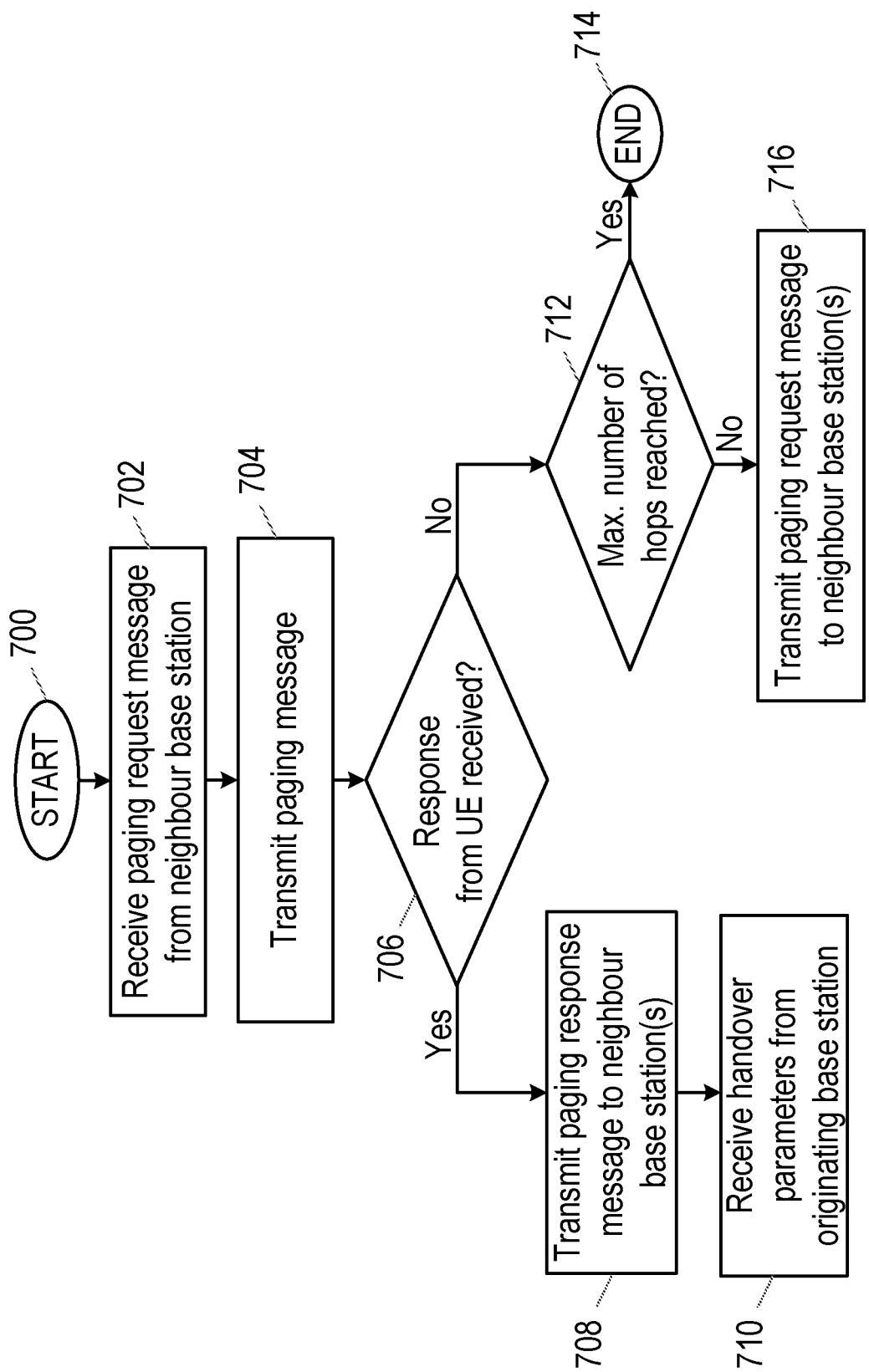
FIG. 7 is a flowchart of another method according to examples of the present disclosure.

FIG. 7 shows a flow chart of a method in accordance with examples of the present disclosure. The method may be carried out in a network node, such as a base station, or in a server that is remote from a base station. The method relates to a process that is carried out in conjunction with a base station that does not originate a paging context as previously described, but receives a paging request message. That is, the method may be carried out in any of the eNBs shown in FIGS. 3a, 3ba, 3bb, 4a, 4b, 5a, and 5b apart from eNB0, or in a server that is located remote from those eNBs (but nonetheless issues control instructions for the eNB and obtains information from signals received by the eNB). The method starts in step 700.

In step 702, the base station receives a paging request message from a neighbour base station (e.g. through the X2 interface or equivalent interface). The paging request message may include one or more of: UE ID, paging context ID, a return path, maximum "hops" and the TAI list for the UE.

In one example, the base station may compare the paging context ID in the received message to a list of stored paging context IDs for which the base station has previously handled paging request messages (and not deleted). If the paging context ID in the received message is found in the list, the paging request message may be discarded or ignored. In another example, the base station may discard or ignore the paging request message if none of the TAIs for the base station is contained in the TAI list of the paging request message.

If the paging context ID in the received message is not found in the list, the paging context ID may be saved to the list and, in step 704, a paging message for the UE transmitted to the cells served by the base station over the radio interface (e.g. Uu). The paging message may contain the UE ID contained in the received paging request message. Multiple such paging messages may be transmitted in an effort to locate the UE.

In step 706, it is determined whether a response is received from the UE. For example, the base station may listen for a response within a time window of transmitting the paging message in step 704. If multiple paging messages are transmitted, the base station may listen for a response to each and any of the transmitted paging messages. Such a response may comprise, for example, a paging response message sent through the radio interface (e.g. Uu interface) to the base station. The paging response message may be "RRC Resume Request" message or an equivalent message that the UE can use to initiate a transition from the inactive state to the connected state.

If a response is received, in step 708 the base station transmits (or is controlled to transmit) a paging response message to one or more of its neighbour base stations (e.g. over the X2 interface or equivalent interface). In an example, a paging response message may be transmitted to each of its neighbour base stations (such as in the example shown in FIGS. 5a and 5b). The paging response message may comprise the paging context ID, and also an indication of the identity of the node which received the response from the UE, or the identity of a cell served by that node in which the UE is located. The base station may also stop transmitting any further paging messages for the UE.

If the paging request message received in step 702 contained a return path parameter, the paging response message transmitted in step 708 may be transmitted to the base station identified in the return path parameter (that is, such as set out in FIGS. 4a and 4b). The paging response message may be of a first type or contain an instruction such that the receiving base station knows that it is to transmit the message on to the next base station in the return path. That is, the return path parameter contains a list of all nodes that have previously handled paging request messages corresponding to the given paging context ID. The nodes may be arranged in order, such that the base station can transmit directly to the most recent node in the list. That node likewise transmits the paging response message to the most recent node in the list (after its own identity), and so on until the paging response message reaches the base station from which the paging context originated. The paging response message may contain the return path itself (such that each node is informed of the next node in the chain from the message itself), or the node may store the return path together with the paging context ID upon receipt of a new paging request message.

In due course, once the paging response messages have reached the base station from which the paging context originated, the method proceeds to step 710 in which handover parameters such as control layer state information or control signals are received by the base station from the originating base station, and in which the base station establishes a connection with the UE. The control layer state information (e.g. RRC connection information) may enable the UE to transition from an inactive state to a connected state. The UE control layer information may comprise information concerning bearers to be activated for the UE, security parameters to be used for the UE connection, UE capabilities information, UE mobility restriction information, etc. The control signals may transfer responsibility for the UE from the originating base station to the receiving base station.

If no response is received to the paging message(s) transmitted in step 704, the method proceeds to step 712 in which it is determined whether the maximum number of hops indicated in the received paging request message has been reached. In examples where each base station decrements the value upon further transmission of a paging request message, the number of hops may be indicated as "0", meaning that no further transmissions of paging request messages are permitted. Alternatively, the paging request message may contain two parameters: the maximum number of hops specified by the originating base station; and the number of hops carried out thus far. If those two numbers match (or if the latter exceeds the former), then no further paging request messages are permitted to be transmitted. In that case, the method ends at step 714. The base station may continue to transmit paging messages until a timeout is reached.

In another example, where the paging request message contains the TAI list for the UE, the base station may check to see if its neighbour base station(s) are on the TAI list or not. In one example, if at least one of the neighbour base stations is on the TAI list, then the method proceeds to step 716. If none of the neighbour base stations is on the TAI list, then the method may again end at step 714.

If the maximum number of permitted hops has not been reached, or at least one neighbour base station is on the TAI list, the method proceeds to step 716 in which the base station transmits (or is controlled to transmit) a respective paging request message to its neighbour base station(s). In one example, the paging request message is transmitted to all neighbour base stations with the exception of the base station from which the paging request message was received in step 702. In another example, the paging request message is transmitted to only those neighbour base stations that are on the TAI list.

The paging request messages may contain the same UE ID and paging context ID as the paging request message received in step 702. The maximum "hop" may be decremented by 1 (or alternatively the number of hops to date may be incremented by 1). The TAI list may be included again, if present in the paging request message received in step 702. If present, the return path parameter is configured to list both the node(s) listed in the paging request message received in step 702, and the base station that transmits the paging request message in step 716.

In alternative embodiments, the base station may transmit the paging request message at an earlier stage, e.g. upon reception of the paging request message in step 702, assuming that the maximum number of hops has not been reached. In such embodiments, the paging request message may be transmitted before the paging message itself, or simultaneously with the paging message, or before any determination that no response has been received to the paging message. In this way, latency in paging the UE may be reduced at the cost of additional traffic over the network. If the UE responds to the paging message transmitted by base station, then the paging request message has no utility and represents wasted resources. However, if the UE does not respond, then time will be saved in waiting for the response.

Figure 8:
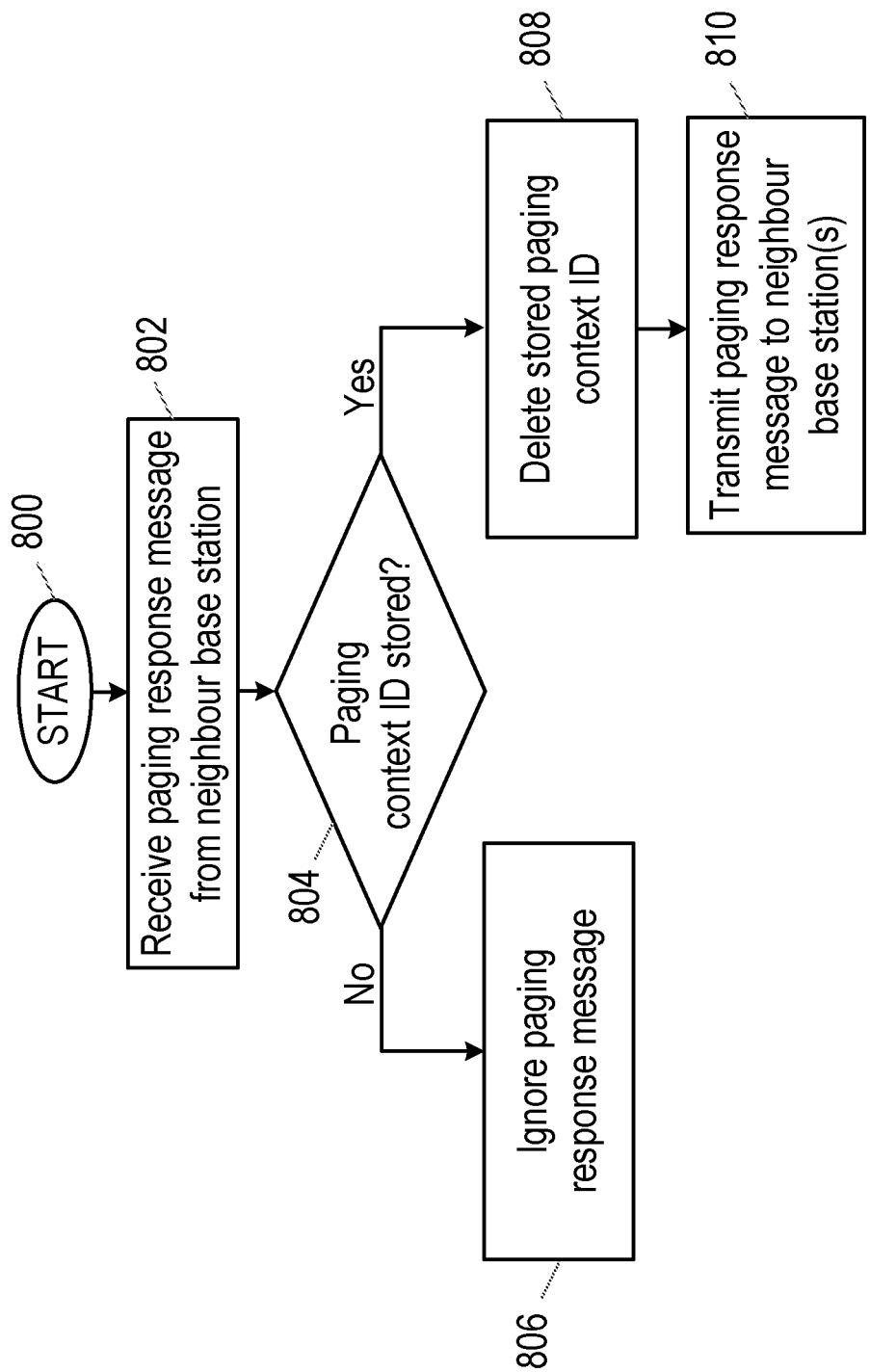
FIG. 8 is a flowchart of a further method according to examples of the present disclosure.

FIG. 8 shows a flow chart of a method in accordance with examples of the present disclosure. The method may be carried out in a network node, such as a base station, or in a server that is remote from a base station. The method relates to a process that is carried out in conjunction with a base station that receives a paging response message. The method may be carried out in any of the eNBs shown in FIGS. 3*a*, 3*ba*, 3*bb*, 4*a*, 4*b*, 5*a* and 5*b*. The method begins in step 800.

In step 802, the base station receives a paging response message from a neighbour base station. The paging response message may comprise the paging context ID, and also an indication of the identity of the node which received the response from the UE, or the identity of a cell served by that node in which the UE is located.

In step 804, it is determined whether the paging context ID in the received paging response message corresponds to one of the paging context IDs contained in a list associated with the base station. The list comprises paging contexts that the base station has previously handled (and not deleted).

If the paging context ID is not in the list (e.g. because the base station has never handled that paging context or has previously deleted the context ID from its list), the method proceeds to step 806 and the paging response message is discarded or ignored.

If the paging context ID is in the list, the method proceeds to step 808 where the paging context ID is deleted from the list, and any on-going paging messages for the UE associated with the paging context ID that may be scheduled for future transmission are halted (if there are any). In step 810, the base station transmits a paging response message to one or more (or all) of its neighbour base station(s) (e.g. through the X2 interface or equivalent interface). The paging response messages may contain the same paging context ID, and the indication of the identity of the node which received the response from the UE, or the identity of a cell served by that node in which the UE is located.

Figure 9:
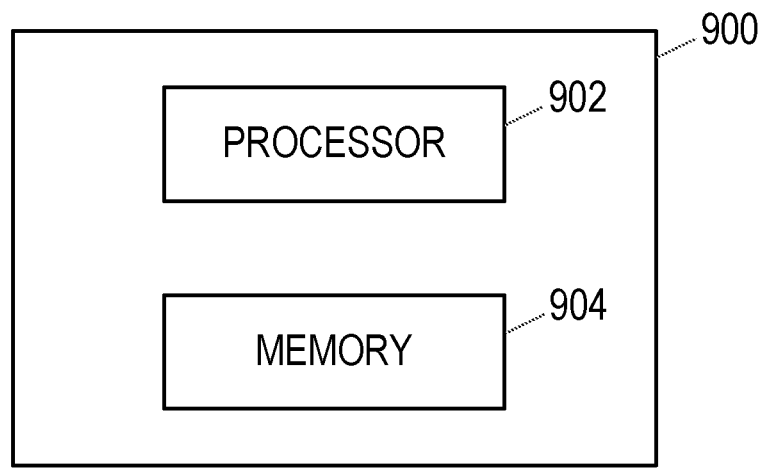
FIG. 9 is a schematic drawing of a network node according to examples of the present disclosure.

FIG. 9 shows a network node 900 according to an example of the present disclosure. The network node 900 may be suitable for use as the originating base station described above (e.g. eNB0) or as a server sending control instructions for the originating base station and obtaining information received from the originating base station. The network node 900 is suitable for carrying out the method described in FIG. 6. The network node 900 comprises a processor 902 and a memory 904. The memory 904 contains instructions executable by the processor 902. The network node 900 is operative to initiate transmission, by a first base station, of a paging message for a terminal device; and responsive to a determination that no response to the paging message has been received by the first base station, initiate transmission by the first base station of a paging request message to a second base station. The paging request message comprises an indication of an identity of the terminal device, and a request that the second base station transmit a paging message for the terminal device. In order to initiate transmission of one or more messages, the network node may transmit the one or more messages using transceiver circuitry and/or one or more antennas located in the network node, or send one or more control instructions to a base station for the base station to transmit the one or more messages using its own transceiver circuitry and one or more antennas.

Figure 10:
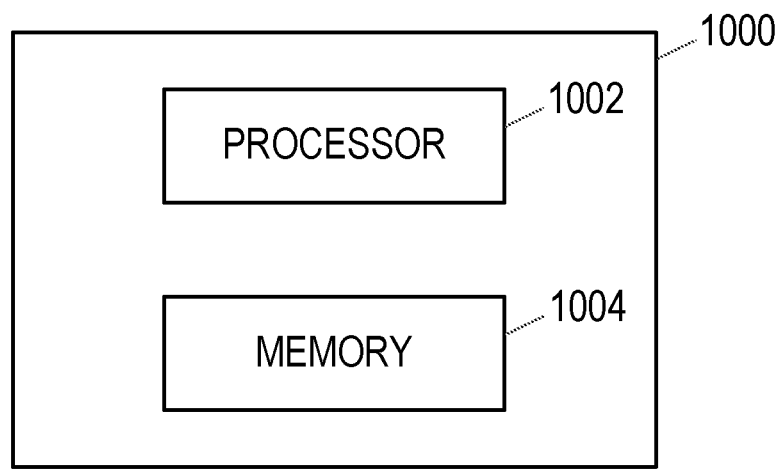
FIG. 10 is a schematic drawing of another network node according to examples of the present disclosure.

FIG. 10 shows a network node 1000 according to an example of the present disclosure. The network node 1000 may be suitable for use as a base station other than the originating base station described above (e.g. any one of eNB1 to eNB11) or as a server sending control instructions for one of those base stations and obtaining information received from one of those base stations. The network node 1000 is suitable for carrying out the method described in FIG. 7. The network node 1000 comprises a processor 1002 and a memory 1004. The memory 1004 contains instructions executable by the processor 1002. The network node 1000 is operative to, responsive to receipt, by a second base station, of a paging request message from a first base station, wherein the paging request message comprises an indication of an identity of a terminal device, and a request that the second base station transmit a paging message for the terminal device, initiate transmission by the second base station of a paging message for the terminal device. In order to initiate transmission of one or more messages, the network node may transmit the one or more messages using transceiver circuitry and/or one or more antennas located in the network node, or send one or more control instructions to a base station for the base station to transmit the one or more messages using its own transceiver circuitry and one or more antennas.

Figure 11:
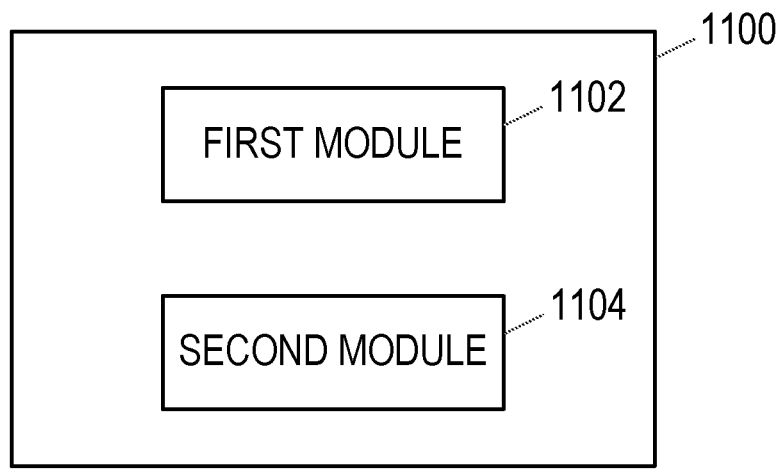
FIG. 11 is a schematic drawing of another network node according to examples of the present disclosure.

FIG. 11 shows a network node 1100 according to an example of the present disclosure. The network node 1100 may be suitable for use as the originating base station described above (e.g. eNB0) or as a server sending control instructions for the originating base station and obtaining information received from the originating base station. The network node 1100 is suitable for carrying out the method described in FIG. 6. The network node 1100 comprises a first module 1102 and a second module 1104. The first module 1102 is configured to initiate transmission, by a first base station, of a paging message for a terminal device. The second module 1104 is configured to, responsive to a determination that no response to the paging message has been received by the first base station, initiate transmission by the first base station of a paging request message to a second base station. The paging request message comprises an indication of an identity of the terminal device, and a request that the second base station transmit a paging message for the terminal device. In order to initiate transmission of one or more messages, the network node 1100 may transmit the one or more messages using transceiver circuitry and/or one or more antennas located in the network node, or send one or more control instructions to a base station for the base station to transmit the one or more messages using its own transceiver circuitry and one or more antennas.

Figure 12:
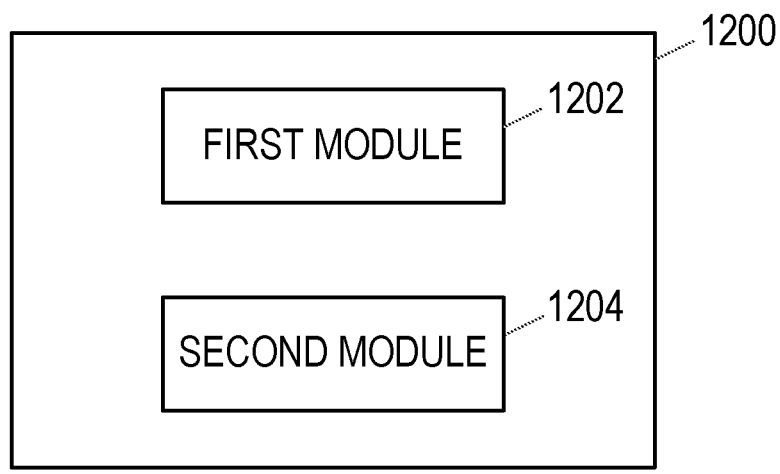
FIG. 12 is a schematic drawing of another network node according to examples of the present disclosure.

FIG. 12 shows a network node 1200 according to an example of the present disclosure. The network node 1200 may be suitable for use as a base station other than the originating base station described above (e.g. any one of eNB1 to eNB11) or as a server sending control instructions for one of those base stations and obtaining information received from one of those base stations. The network node 1200 is suitable for carrying out the method described in FIG. 7. The network node 1200 comprises a first module 1202 and a second module 1204. The first module 1202 is configured to determine whether a second base station has received a paging request message from a first base station, wherein the paging request message comprises an indication of an identity of a terminal device, and a request that the second base station transmit a paging message for the terminal device. The second module 1204 is configured to initiate transmission by the second base station of a paging message for the terminal device. In order to initiate transmission of one or more messages, the network node may transmit the one or more messages using transceiver circuitry and/or one or more antennas located in the network node, or send one or more control instructions to a base station for the base station to transmit the one or more messages using its own transceiver circuitry and one or more antennas.

The present disclosure thus provides apparatus and methods for paging a terminal device in a wireless communications network.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method in a network node of a wireless telecommunication network, the method comprising:
    initiating transmission by a second base station of one or more paging messages for a terminal device via a radio interface of the second base station, in response to the second base station receiving a first paging request message sent from a neighboring first base station over an inter-base-station interface,
    wherein the first paging request message comprises an indication of an identity of the terminal device, and a request that the second base station transmit the one or more paging messages for the terminal device,
    wherein the first paging request message further comprises a paging context identity, and
    wherein the method further comprises:
        upon receipt by the second base station of a further paging request message, the further paging request message comprising a paging context identity, comparing the paging context identity of the further paging request message to the paging context identity of the first paging request message; and
        responsive to a determination that the paging context identity of the further paging request message matches the paging context identity of the first paging request message, ignoring the further paging request message.

2. The method as set out in claim 1, further comprising:
    upon receipt by the second base station of a paging response message from another base station, the paging response message comprising a paging context identity and an indication that the terminal device responded to a paging message transmitted by a remote base station, comparing the paging context identity of the paging response message to the paging context identity of the first paging request message; and
    responsive to a determination that the paging context identity of the paging response message matches the paging context identity of the first paging request message, halting transmission by the second base station of further ones of the one or more paging messages for the terminal device.

3. The method as set out in claim 2, further comprising:
    responsive to a determination that the paging context identity of the paging response message matches the paging context identity of the first paging request message, initiating transmission of a further paging response message to one or more neighbor base stations, wherein the further paging response message comprises the paging context identity.

4. A network node configured to operate in a wireless telecommunication network, the network node comprising:
a processor; and
a memory containing instructions executable by the processor, whereby the network node is operative to:
   initiate transmission by a second base station of one or more paging messages for a terminal device via a radio interface of the second base station, in response to the second base station receiving a first paging request message sent from a neighboring first base station over an inter-base-station interface, wherein the first paging request message comprises an indication of an identity of the terminal device, and a request that the second base station transmit one or more paging messages or the terminal device; and
wherein the first paging request message further comprises a paging context identity, and
wherein the network node is further operative to:
   upon receipt by the second base station of a further paging request message, the further paging request message comprising a paging context identity, compare the paging context identity of the further paging request message to the paging context identity of the first paging request message, and
   responsive to a determination that the paging context identity of the further paging request message matches the paging context identity of the first paging request message, ignore the further paging request message.

5. The network node as set out in claim 4, whereby the memory contains instructions whereby the network node is further operative to:
   initiate transmission by the second base station of a second paging request message to at least a neighboring third base station, at least upon the second base station experiencing a paging failure with respect to the terminal device,
   wherein the second paging request message is transmitted over an inter-base-station interface between the second and third base stations and comprises an indication of the identity of the terminal device, and a request that the third base station transmit one or more paging messages for the terminal device.

6. The network node as set out in claim 5, wherein the memory contains instructions whereby the network node is operative to initiate transmission of the second paging request message, responsive to determining that paging of the terminal device by the second base station failed.

* * * * *